US009933297B2

(12) United States Patent
Barnard

(10) Patent No.: US 9,933,297 B2
(45) Date of Patent: Apr. 3, 2018

(54) SYSTEM AND METHOD FOR PLANNING AND MONITORING A LIGHT SENSORY NETWORK

(71) Applicant: SENSITY SYSTEMS, INC., Sunnyvale, CA (US)

(72) Inventor: Chris Barnard, Sunnyvale, CA (US)

(73) Assignee: Sensity Systems Inc., Sunnyvale, CA (US)

(*) Notice: Subject to any disclaimer, the term of this patent is extended or adjusted under 35 U.S.C. 154(b) by 864 days.

(21) Appl. No.: 14/224,435

(22) Filed: Mar. 25, 2014

(65) Prior Publication Data

US 2014/0297227 A1  Oct. 2, 2014

Related U.S. Application Data

(60) Provisional application No. 61/805,326, filed on Mar. 26, 2013.

(51) Int. Cl.
*H05B 37/02* (2006.01)
*G01J 1/42* (2006.01)

(52) U.S. Cl.
CPC ............ *G01J 1/42* (2013.01); *H05B 37/0227* (2013.01); *H05B 37/0272* (2013.01); *G01J 2001/4247* (2013.01)

(58) Field of Classification Search
CPC ................ G01J 1/42; G01J 2001/4247; H05B 37/0227; H05B 37/0272
See application file for complete search history.

(56) References Cited

U.S. PATENT DOCUMENTS

| 4,384,288 A | 5/1983 | Walton |
| 5,161,107 A | 11/1992 | Mayeaux et al. |
| 5,161,607 A | 11/1992 | Mayeaux et al. |
| 5,793,491 A | 8/1998 | Wangler et al. |

(Continued)

FOREIGN PATENT DOCUMENTS

| CA | 2690148 A | 12/2008 |
| CN | 102110376 B | 11/2012 |

(Continued)

OTHER PUBLICATIONS

J. Xu et al., "Distance Measurement Model Based on RSSI in WSN," Wireless Sensor Network, 2010, 2, 606-611.

(Continued)

*Primary Examiner* — Janet Suglo

(57) ABSTRACT

A method of determining the position of an array of sensors, an array of solid-state lamps, or other devices which sense or emit electromagnetic waves includes first determining a sensing or emitting distribution for one of the devices, then integrating that distribution over the area to be covered by the sensors or emitters. In response to the integrated distribution, the sensors or emitters may be repositioned, reconfigured, or reoriented to provide desired coverage. Wireless access points that communicate to wireless end points associated with the lights and/or sensors are designed and positioned to provide adequate signal strength. All elements, light distribution, sensor range, and wireless signal strength may be plotted in contour plots within the same user interface that enables users to place the devices in a specified area.

18 Claims, 27 Drawing Sheets

(56) References Cited

U.S. PATENT DOCUMENTS

| | | | |
|---|---|---|---|
| 6,118,230 A | 9/2000 | Fleischmann | |
| 6,208,379 B1* | 3/2001 | Oya | G08B 13/1968 |
| | | | 348/143 |
| 6,364,253 B1 | 4/2002 | Cavangh | |
| 6,608,453 B2 | 8/2003 | Morgan et al. | |
| 6,683,539 B2 | 1/2004 | Trajkovic et al. | |
| 6,696,945 B1 | 2/2004 | Venetianer et al. | |
| 6,961,313 B1 | 11/2005 | Gaspar | |
| 6,970,083 B2 | 11/2005 | Venetianer et al. | |
| 6,999,882 B2 | 2/2006 | Frie et al. | |
| 7,304,727 B2 | 12/2007 | Chien et al. | |
| 7,333,903 B2 | 2/2008 | Walters et al. | |
| 7,583,815 B2 | 9/2009 | Zhang et al. | |
| 7,613,324 B2 | 11/2009 | Venetianer et al. | |
| 7,613,590 B2 | 11/2009 | Brown | |
| 7,674,018 B2 | 3/2010 | Holder et al. | |
| 7,817,063 B2 | 10/2010 | Hawkins et al. | |
| 7,825,602 B2 | 11/2010 | Hu et al. | |
| 7,868,912 B2 | 1/2011 | Venetianer et al. | |
| 7,925,249 B2 | 4/2011 | Funk et al. | |
| 7,925,384 B2 | 4/2011 | Huizenga et al. | |
| 7,932,923 B2 | 4/2011 | Lipton et al. | |
| 7,983,685 B2 | 7/2011 | Silverstrim et al. | |
| 7,986,339 B2 | 7/2011 | Higgins | |
| 8,027,809 B2 | 9/2011 | Brown | |
| 8,049,592 B2 | 11/2011 | Wang et al. | |
| 8,073,554 B2 | 12/2011 | Vezza et al. | |
| 8,078,431 B2 | 12/2011 | Brown | |
| 8,095,340 B2 | 1/2012 | Brown | |
| 8,111,018 B2 | 2/2012 | You | |
| 8,147,267 B2 | 4/2012 | Oster | |
| 8,244,260 B2 | 8/2012 | Silverstrim et al. | |
| 8,285,986 B2 | 10/2012 | Shon et al. | |
| 8,306,051 B2 | 11/2012 | Stocker | |
| 8,334,901 B1 | 12/2012 | Ganick et al. | |
| 8,334,906 B2 | 12/2012 | Lipton et al. | |
| 8,436,542 B2 | 5/2013 | Middleton-White et al. | |
| 8,438,175 B2 | 5/2013 | Papke et al. | |
| 8,441,397 B2 | 5/2013 | Binzer et al. | |
| 8,461,963 B2 | 6/2013 | Ko et al. | |
| 8,464,182 B2 | 6/2013 | Blumenberg et al. | |
| 8,493,209 B2 | 7/2013 | Mohan et al. | |
| 8,510,550 B2 | 8/2013 | Westhoff et al. | |
| 8,514,082 B2 | 8/2013 | Cova et al. | |
| 8,522,029 B2 | 8/2013 | Agrawal et al. | |
| 8,531,134 B2 | 9/2013 | Chemel et al. | |
| 8,532,962 B2 | 9/2013 | Zhang et al. | |
| 8,533,491 B2 | 9/2013 | Klein | |
| 8,542,130 B2 | 9/2013 | Lavoie | |
| 8,558,889 B2 | 10/2013 | Martin et al. | |
| 8,560,357 B2 | 10/2013 | Sickenius | |
| 8,564,661 B2 | 10/2013 | Lipton et al. | |
| 8,575,861 B1 | 11/2013 | Gordin et al. | |
| 8,582,816 B2 | 11/2013 | Lee et al. | |
| 8,587,225 B2 | 11/2013 | Ashar et al. | |
| 8,590,011 B1 | 11/2013 | Legault et al. | |
| 8,594,482 B2 | 11/2013 | Fan et al. | |
| 8,607,341 B2 | 12/2013 | Yoon et al. | |
| 8,619,079 B2 | 12/2013 | Peterson et al. | |
| 8,619,549 B2 | 12/2013 | Narayana et al. | |
| 8,635,049 B2 | 1/2014 | Kauffman et al. | |
| 8,732,031 B2 | 5/2014 | Martin et al. | |
| 2003/0102979 A1 | 6/2003 | Jednacz et al. | |
| 2003/0222587 A1 | 12/2003 | Dowling et al. | |
| 2004/0124338 A1 | 7/2004 | Cloutier et al. | |
| 2007/0234036 A1 | 10/2007 | Tan et al. | |
| 2007/0294393 A1 | 12/2007 | Smith et al. | |
| 2008/0215391 A1 | 9/2008 | Dowling et al. | |
| 2009/0026966 A1 | 1/2009 | Budde et al. | |
| 2009/0262189 A1 | 10/2009 | Marman | |
| 2009/0278479 A1 | 11/2009 | Platner et al. | |
| 2009/0299527 A1 | 12/2009 | Huizenga et al. | |
| 2009/0307255 A1 | 12/2009 | Park | |
| 2010/0001652 A1 | 1/2010 | Damsleth | |
| 2010/0228601 A1 | 9/2010 | Vaswani et al. | |
| 2011/0002324 A1 | 1/2011 | Falck et al. | |
| 2011/0066297 A1 | 3/2011 | Saberi et al. | |
| 2011/0084841 A1* | 4/2011 | Gyorfi | H04B 17/27 |
| | | | 340/572.4 |
| 2011/0158410 A1 | 6/2011 | Falk et al. | |
| 2012/0002406 A1 | 1/2012 | Leadford et al. | |
| 2012/0038281 A1 | 2/2012 | Verfuerth | |
| 2012/0040606 A1 | 2/2012 | Verfuerth | |
| 2012/0068608 A1 | 3/2012 | Covaro et al. | |
| 2012/0086561 A1 | 4/2012 | Ilyes et al. | |
| 2012/0130544 A1 | 5/2012 | Mohan et al. | |
| 2012/0130774 A1 | 5/2012 | Ziv et al. | |
| 2012/0143357 A1 | 6/2012 | Chemel et al. | |
| 2012/0146518 A1 | 6/2012 | Keating et al. | |
| 2012/0206050 A1* | 8/2012 | Spero | B60Q 1/04 |
| | | | 315/152 |
| 2012/0262093 A1 | 10/2012 | Recker et al. | |
| 2012/0310984 A1 | 12/2012 | Branson et al. | |
| 2013/0010251 A1 | 1/2013 | Croft et al. | |
| 2013/0013091 A1 | 1/2013 | Cavalcanti et al. | |
| 2013/0073192 A1 | 3/2013 | Hota et al. | |
| 2013/0088168 A1 | 4/2013 | Mohan et al. | |
| 2013/0107041 A1 | 5/2013 | Norem et al. | |
| 2013/0134886 A1 | 5/2013 | Golding et al. | |
| 2013/0158952 A1 | 6/2013 | Liebel et al. | |
| 2013/0159454 A1 | 6/2013 | Hunter et al. | |
| 2013/0211613 A1 | 8/2013 | Praske et al. | |
| 2013/0221203 A1 | 8/2013 | Barrilleaux | |
| 2013/0227569 A1 | 8/2013 | Kohli et al. | |
| 2013/0229804 A1 | 9/2013 | Holder et al. | |
| 2013/0265563 A1 | 10/2013 | Vogt et al. | |
| 2013/0297212 A1 | 11/2013 | Ramer et al. | |
| 2013/0342355 A1 | 12/2013 | Lund et al. | |
| 2013/0346229 A1 | 12/2013 | Martin et al. | |

FOREIGN PATENT DOCUMENTS

| | | |
|---|---|---|
| CN | 102867386 A | 1/2013 |
| CN | 20293979 U | 5/2013 |
| CN | 202939797 | 5/2013 |
| EP | 1658579 A1 | 5/2006 |
| EP | 2581888 A1 | 4/2013 |
| EP | 2660625 A1 | 11/2013 |
| EP | 2709428 A2 | 3/2014 |
| KR | 10-2007-0044243 A | 4/2007 |
| KR | 10-0760535 B1 | 9/2007 |
| KR | 10-0784836 B1 | 12/2007 |
| KR | 2010-0136186 | 12/2010 |
| KR | 2011-0017037 | 2/2011 |
| KR | 2011-0055807 A | 5/2011 |
| WO | WO2003055734 A1 | 7/2003 |
| WO | WO2008008505 A2 | 1/2008 |
| WO | WO2008085815 A1 | 7/2008 |
| WO | WO2009076182 A1 | 6/2009 |
| WO | WO2011041903 A1 | 4/2011 |
| WO | WO2011/053969 A2 | 5/2011 |
| WO | WO2011121470 A1 | 10/2011 |
| WO | WO2011132013 A1 | 10/2011 |
| WO | WO2012042432 A1 | 4/2012 |
| WO | WO2012092150 A2 | 7/2012 |
| WO | WO2012140152 A1 | 10/2012 |
| WO | WO2013131189 A1 | 9/2013 |
| WO | WO2013165777 A1 | 11/2013 |

OTHER PUBLICATIONS

D. Munoz et al., "Position Location Techniques and Applications," Academic Press, 2009.

International Search Report, International Application No. PCT/US2013/045407, dated Sep. 23, 2013.

International Search Report, International Application No. PCT/US2013/037968, dated Jul. 2, 2013.

Korean Intellectual Property Office, Korean Application No. 10-2013-0109844, Office Action dated Jul. 24, 2014.

International Search Report, International Application No. PCT/US2014/031723, dated Jul. 7, 2014.

(56) References Cited

OTHER PUBLICATIONS

U.S. Appl. No. 14/224,300, filed Mar. 25, 2014, Non-Final Office Action, dated Jul. 8, 2014.

* cited by examiner

| Customer name | | | | | | | | | |
|---|---|---|---|---|---|---|---|---|---|
| GPS location | | | | | | | | | |
| Date | | | | | | | | | |
| | | Light module | | | Occ Sensor | Camera | | | |
| X location (feet) | Y location (feet) | Fixture | Lens type | Number | Drive current (mA) | Lens type | Lens type | Angle | Other sensor | Part number |
| 0 | 0 | Canopy | V | 2 | 600 | L2 | F60 | 125 | Temp | XX-YYY-123 |
| 10 | 20 | Canopy | V | 1 | 700 | L2 | F60 | 95 | Temp | XX-YYY-124 |
| 20 | 20 | Canopy | V | 1 | 700 | L2 | | | Temp | XX-YYY-125 |
| 30 | 30 | Canopy | V | 1 | 700 | L2 | | | Temp | XX-YYY-126 |
| 10 | 40 | Canopy | V | 1 | 700 | L2 | | | Temp | XX-YYY-127 |
| 40 | 10 | Canopy | V | 2 | 500 | L2 | | | Temp | XX-YYY-126 |

230

SYSTEM AND METHOD FOR PLANNING AND MONITORING A LIGHT SENSORY NETWORK

RELATED APPLICATIONS

The present application claims the benefit of priority to U.S. Provisional Application No. 61/805,326, entitled "System for Management of Lighting, Sensor, and Wireless Access Point Placement," filed Mar. 26, 2013, the entire contents of which may be hereby incorporated by reference.

BACKGROUND OF THE INVENTION

The invention relates to lighting, sensors, and network equipment.

SUMMARY OF THE INVENTION

The various embodiments include methods, systems, devices, processor-readable non-transitory storage media, and/or processor-executable instructions that may be used to select, position, install, and visualize components of a light sensory network (LSN). Some embodiments may include an embodiment method for designing a light sensory network (LSN) in a specified area, the method may include operations for selecting luminaires, sensors, and network devices with known characteristics from a product library, calculating an illumination over the specified area for the selected luminaires, wherein the selected luminaires may be installed at specific mounting locations within the specified area, adjusting dimming levels of the selected luminaires to meet specified requirements for a maximum illumination and a minimum illumination based on the calculated illumination, calculating a range of the selected sensors over the specified area, adjusting one or more of the selected sensors such that the adjusted sensors may be capable of detecting specified events or parameters at a specified set of points within the specified area, wherein adjusting the one or more of the selected sensors includes adjusting orientations of the selected sensors, calculating a range of wireless network devices integrated with the selected luminaires and the selected sensors, adjusting one or more network elements, antenna gains, and locations of the selected network devices such that the network devices have sufficient margin to communicate with control software on a remote computer, displaying, on a display, an image of the specified area with wireless network locations, ranges, and signal strengths for the selected luminaires, the selected sensors, and the selected network devices, and tabulating at least one of the selected devices, equipment settings, power consumption, and locations.

In some embodiments, the step of displaying may include displaying a contour plot as a function of desired coordinates to illustrate to a user the calculated illumination, the calculated range of the selected sensors, and the calculated range of the wireless network devices. In some embodiments, for each luminaire in the product library, the step of calculating the illumination over the specified area may include measuring a Candela distribution versus viewing angles of a typical luminaire at a peak drive current, storing results from the measurement of the Candela distribution versus the viewing angles of the typical luminaire at the peak drive current in a first format that tabulates Candela versus horizontal and vertical viewing angles, measuring a proportional change in Candelas at a specified viewing angle versus the peak drive current of the typical luminaire, storing results from the measurement of the proportional change in a second format that tabulates a percent change in Candela versus the peak drive current, specifying an array of calculation points in the specified area, adding, for each calculation point in the array of calculations points in the specified area, a foot-candle contribution, wherein the adding may include calculating a distance and angles from the each calculation point to each luminaire in the product library, interpolating a table of Candela versus horizontal and vertical angles to obtain a Candela value at a peak drive current at the calculation point, interpolating a table of percent change in Candela versus the peak drive current to obtain a Candela value of each luminaire, and using the calculated angles and the calculated distance to calculate the foot-candle contribution from each luminaire. In some embodiments, the method may further include obtaining target specifications for illumination in the specified area by measuring an existing illumination over the specified area with a mobile measuring device that moves along a path through the specified area while measuring illumination as a function of position in the specified area. In some embodiments, tabulating the power consumption may include measuring a typical power consumption of each device in the product library at maximum settings, measuring how the typical power consumption changes for adjustable devices in the product library, wherein the adjustable devices have adjustable output levels, calculating output levels for each of the adjustable devices, using the calculated output levels of each of the adjustable devices to calculate the power consumption of each of the adjustable devices, and adding up the calculated power consumption of all the adjustable devices. In some embodiments, the method may further include comparing the tabulated power consumption to a known power consumption of legacy equipment to estimate a change in power between the LSN and the legacy equipment.

In some embodiments, the step of selecting the sensors may include specifying parameters to be monitored, and selecting sensor devices that monitor the specified parameters, the method may further include specifying observation points for one or more of the specified parameters, specifying observation angles for one or more of the specified observation points, determining sensor locations that may be within a range of the specified observation points, and determining sensor orientations for the selected sensor devices that observe the specified observation points at the specified observation angles. In some embodiments, the known characteristics of the selected luminaires, the selected sensors, and the selected network devices may be tabulated as intensity levels versus horizontal and vertical angles such that a signal strength at any direction and a distance can be calculated from each of the selected luminaires, the selected sensors, and the selected network devices. In some embodiments, the calculated illumination, location, and orientation of the selected sensors may be used to calculate a possible power generated by photovoltaic cells mounted on the selected sensors.

Some embodiments may include a system for designing a light sensory network (LSN) in a specified area, the system including at least a database, a user interface, and processor-executable instructions configured to cause a processor to perform operations that may include selecting luminaires, sensors, and network devices with known characteristics from a product library, calculating an illumination over the specified area for the selected luminaires, wherein the selected luminaires may be installed at specific mounting locations within the specified area, adjusting dimming levels of the selected luminaires to meet specified requirements for a maximum illumination and a minimum illumination based on the calculated illumination, calculating a range of the selected sensors over the specified area, adjusting one or more of the selected sensors such that the sensors may be capable of detecting specified events or parameters at a specified set of points within the specified area, wherein adjusting the one or more of the selected sensors includes adjusting orientations, calculating a range of wireless network devices integrated with the selected luminaires and the selected sensors, adjusting one or more network elements, antenna gains, and locations of the selected network devices such that the network devices have sufficient margin to communicate with control software on a remote computer, displaying, on a display, an image of the specified area with wireless network locations, ranges, and signal strengths for the selected luminaires, the selected sensors, and the selected network devices, and tabulating at least one of the selected devices, equipment settings, power consumption, and locations.

In some embodiments, the processor-executable instructions may be configured to cause the processor to perform operations further comprising calculating an illuminance over the specified area by interpolating tables of luminous intensity versus horizontal, vertical angles, and dimming levels for each of the selected luminaires for adding up a cumulative illuminance at each specified point in the specified area, automatically increasing a number of lighting modules at one or more luminaire locations when the cumulative illuminance at any point in the specified area falls below a specified minimum illuminance, automatically adjusting dimming percentages to luminaires when the cumulative illuminance at any point in the specified area falls above a specified maximum illuminance, and outputting in a useable format the location, type, and dimming level of each of the selected luminaires. In some embodiments, the processor-executable instructions may be configured to cause the processor to perform operations further comprising automatically calculating the power consumption using input data comprising a typical power consumption of each device in the product library at maximum settings, input functions defining how the typical power consumption changes for adjustable devices in the product library with adjustable output levels, calculating the output levels of each of the adjustable devices, and using the calculated output levels of each of the adjustable devices to calculate the power consumption of each of the adjustable devices, adding up the power consumption of all the adjustable devices, listing a total power consumption of each integrated LSN element, and listing the power consumption of a specified group of devices.

In some embodiments, the processor-executable instructions include design software and may be configured to cause the processor to perform operations further comprising exchanging real-time data with software that controls and monitors the light sensory network, wherein the real-time data specifies lighting levels, sensor readings, and wireless signal strengths, and displaying, on the display, the image of the specified area with locations, ranges, and the signal strengths of the selected luminaires, the selected sensors, and the selected network devices using the real-time data. In some embodiments, one or more of the selected sensors may be one of still cameras or video cameras that can be selected, located, and rotated to point at specified observation points within specified angular ranges. In some embodiments, the processor-executable instructions may be configured to cause the processor to perform operations further comprising estimating an operating margin of all network devices to a single server, and adding one or more network devices in response to determining the estimated operating margin for any of the one or more network devices may be not adequate.

Some embodiments may include a system for selecting, locating, and pointing sensors in a specified area, the system comprising at least a database, a user interface, and processor-executable instructions configured to cause a processor to perform operations that may include receiving inputs from a user, the inputs including specified parameters to be measured at specified observation points, optional specified viewing angles of one or more of the specified parameters at the specified observation points, and optional specified sensor locations, and calculating an optimum placement and an optimum orientation of the sensors with parameters listed in the database by calculating a range and a viewing angle of each of the sensors for each of the specified parameters, the specified observation points, and the specified viewing angles. In some embodiments, one of the specified parameters may be incident light that powers the sensors. In some embodiments, one or more of the sensors may be cameras that include one or more of still cameras and video cameras, and wherein the user interface may include an interactive function to select, locate, and rotate the cameras to point at the specified observation points within specified angular ranges.

An embodiment method of adjusting devices within a lighting sensor network (LSN) that includes an array of sensors or emitters, an array of solid-state lamps, and devices that sense or emit electromagnetic waves may include operations for determining a sensing or emitting distribution for one or more of the devices that sense or emit electromagnetic waves; integrating the sensing or emitting distribution over an area to be covered by the array of sensors or emitters; and adjusting the sensors or emitters in the array of sensors or emitters to provide a desired coverage based on the integrated distribution, wherein adjusting comprises at least one of repositioning, reconfiguring, and reorienting the sensors or emitters in the array. In some embodiments, the LSN may include wireless access points that are configured to communicate to wireless end points associated with the array of solid-state lamps and/or the array of sensors or emitters, are designed to provide adequate signal strength, and are positioned to provide adequate signal strength.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION OF PREFERRED EMBODIMENTS

Figure 1:
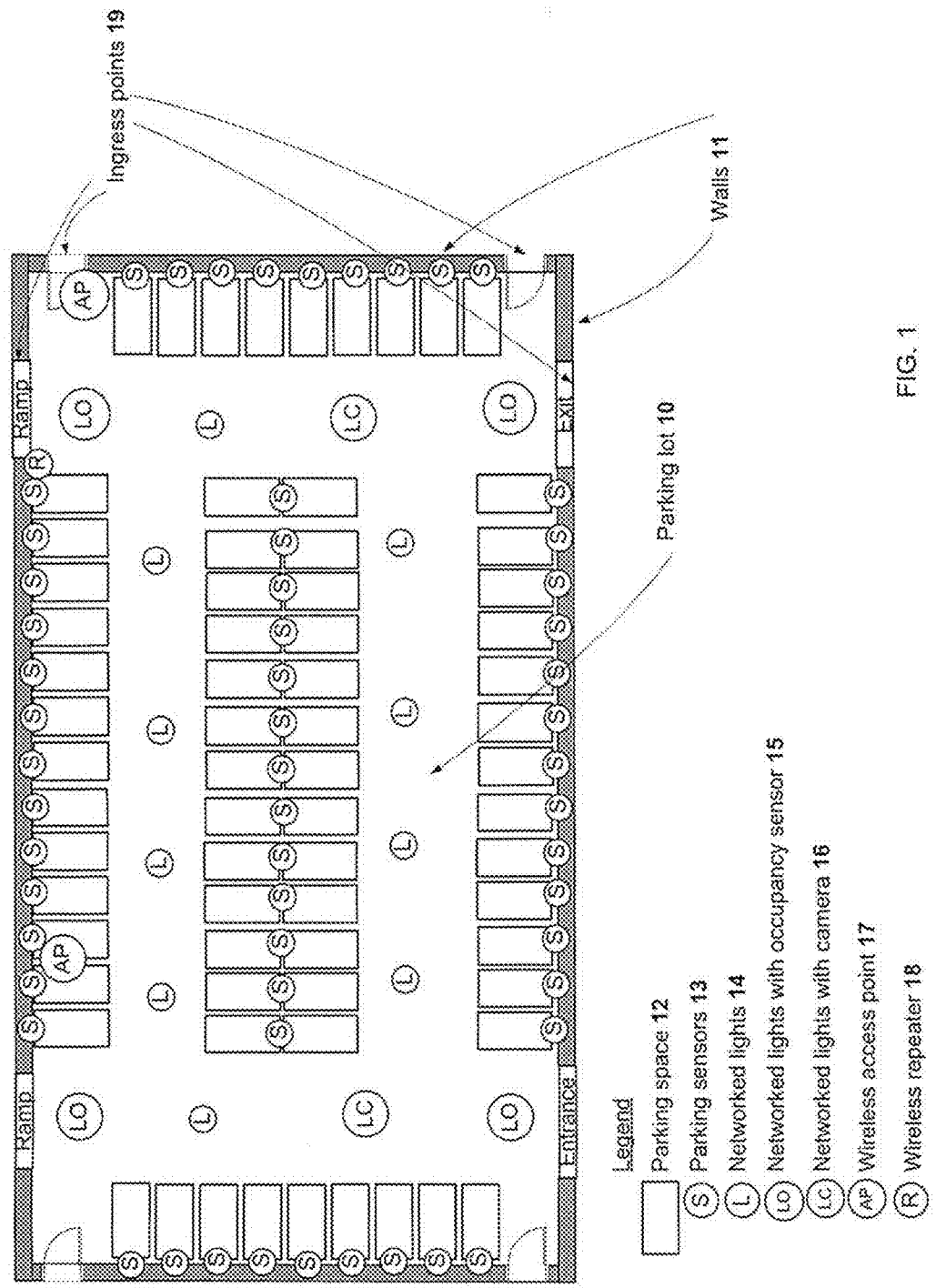
FIG. 1 is a schematic top view of an exemplary parking lot illustrating the equipment placement for a light sensory network.

The various embodiments are described in detail with reference to the accompanying drawings. Wherever possible, the same reference numbers are used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

It is desirable to upgrade currently installed incandescent and compact fluorescent light bulbs to LED lights for several reasons: (1) efficiency—LED technology delivers more lumens per Watt than other lighting technologies so that the same illumination may be obtained with significantly lower power consumption; (2) reliability—LED technology has statistically much longer lifetimes than other technologies so that it requires fewer hardware replacements and lower maintenance costs; (3) directionality—as a point source, it is easier to direct LED light with lenses and reflectors so that the light may be concentrated on the desired illumination area and excluded from areas where it may not be desired; and (4) adjustability—software and hardware controls may be used to adjust LED light levels, light distributions, and light colors. Light levels may be adjusted in the factory by setting the LED current and number of LEDs; and further adjusted in the field with a dimmable LED driver.

While the mere replacement of an incandescent bulb with a light emitting diode may suffice in some applications; in many applications, it may be desired to have lighting that meets a particular specification. For example, for lighting an exterior parking lot, it may be often desirable to assure that all portions of the parking lot receive at least a certain minimum level of illumination. For irregularly shaped parking lots with irregularly distributed lights, it may be undesirable to require manual adjustment of the number of and intensity of light emitting diodes provided at each pole in the parking lot. Even if such adjustment were to be performed manually, it may be desirable to be able to control the lighting in a desired manner from a central location. For example, it may be desirable to communicate with the dimmable power supply of each LED light via a communications network to dim the lights in the early morning when individuals are much less likely to be present in the lighted area.

When a lighting system is upgraded to convert legacy lighting to LED lighting with network devices, one or more sensors may be attached to the same network device with that may be used to control and monitor the light levels. Adding sensors to the lighting network has minimal incremental cost since the sensors share the same computing and network components, and share in the installation cost. Examples of sensors that may be integrated with the lighting network are (1) lighting based, which includes daylight, occupancy and motion sensors (US 2012/0143357); (2) security based, which include cameras, motion sensors, and door/window monitors; (3) parking based, which include proximity sensors in parking lots, and (5) radio frequency (RF) based sensors for monitoring network devices such as smartphones, (6) and environmental based, which include temperature, humidity, and gas sensors. Sensors may be collocated with light fixture (which has power), but may also be remotely "tethered" via a short-reach wireless technology such as Bluetooth.

US Patent Publication No. 2013/0346229 describes a light sensory network (LSN) that has a control system that adjusts light levels for LED lighting and reads sensor values, where the sensors and lights are connected to the same control and monitoring software over a common network. The system enables the placement of sensors with each light so that the sensors may detect the presence of individuals, weather conditions, or other detectable information. In such a system, wired or wireless network devices are located at each light so that software running in a remote server communicates with the remote network device to adjust the light levels and read the sensor data. In such systems where wireless networking technology may be employed, it may be desirable to be able to determine the location and number of wireless access points, repeaters, and gateways without need for manual adjustment and positioning of each access point (or AP). This enables the network to function in a proper manner with appropriate signal strength at each node without the necessity of manual adjustment at each node. Other integrated systems with lighting controls are described in U.S. Pat. Nos. 8,436,542 and 8,531,134, and 8,619,549 discusses aspects of wireless access point deployment.

An LSN node includes a power input terminal connected to the power supply of the existing light fixture, a replacement light source, a processor, a network interface coupled to the processor, and a sensor coupled to the processor. The sensor measures one or more parameters at the node, and provides data containing information about the measured parameters to the processor. The network interfaces of the nodes are connected to a remote server over a communications network. Using the communication network, information may be collected from the sensors, and that information may be provided over the network to a computing device. Sensor devices are selected for a given application depending on parameters of the sensor such as accuracy, dynamic range, sensitivity, sensing range, and field of view Planning, installing and monitoring the LSN requires techniques for selecting light, sensor, and network modules and for setting the device locations and parameters to enable first-time ordering of the correct equipment options, and installation without extensive manual adjustment of the equipment on site. A technique is also needed to determine the physical range of sensors deployed at the lighting fixtures. A technique is also needed for determining the location of various transmitting and receiving devices in such a network. For ease of use, a graphical user interface (GUI) is needed to display the superposition of the LSN elements and functionality on a visual map of the LSN location (US Patent Publication No. 2009/0307255). The system design tool should simulate the lighting levels based on a library of available light modules and it should ensure that the installed lighting equipment meets lighting targets based on previous light levels, or industry and government standards. The system design should also estimate the power consumption and savings compared to the legacy technology. The system design tool should also enable selection and placement of sensor modules that are connected to the lighting network modules.

The various embodiments described herein may provide devices, systems, methods, and non-transitory processor-readable storage media for system design methods and software tools that perform the various aspects of lighting sensory network (LSN) system design. Such embodiments may include features that select the luminaire models and dimming levels to meet target light levels; select the type and number of access points and repeaters and their locations so that all networked lights and sensors have a reliable network connection; select the sensor placement and orientation so that the sensors cover the required areas; determine which sensors are integrated with lights and which sensors are standalone with a wireless connection to a neighboring light; assign the primary and secondary connections of each networked device, provide a layered visualization of light levels, sensor ranges, and network ranges overlain on a site map to enable users to visualize all aspects of the system design; estimate light levels incident on any devices powered with photovoltaic cells and estimate photovoltaic energy conversion based on the light levels and selected photovoltaic specifications for different operating conditions; estimate the power consumption of all components; estimate the power consumption per electrical circuit; estimate the power consumption of the complete system; output a bill of materials (BOM) to order the required equipment; output installation guidelines to provision equipment, aim sensors as required, and make the network connections; minimize cost by selecting the lowest cost selection of equipment to meet the system requirements; and after installation, provide real-time data and visualization of the light levels, sensor readings, network signal strengths, and power consumption.

In various embodiments, methods of positioning an array of solid-state lighting fixtures to achieve a desired level of illumination over a specified area are described herein. The methods may be applied to selecting locations, orientations, and brightness for lighting fixtures, either in a retrofit of existing fixtures, or in a new installation. The methods and systems described may also be applied to positioning of sensors in such lighting fixtures for detecting events in the specified area, as well as to the positioning of networking devices such as access points and receivers within the specified area.

In one embodiment a method of retrofitting an array of lighting fixtures with solid-state lamps to provide a desired level of illumination over an area to be illuminated includes the steps of determining an iso-foot-candle distribution for one of the solid-state lamps, the iso-foot-candle distribution enabling calculation of brightness of the solid-state lamp at a set of points on the distribution. Then a step may be performed for each point in the set of points in the distribution, scaling the iso-foot-candle distribution based on (i) a number of the solid-state lamps to be provided at a single location within the array of lighting fixtures and (ii) a dimming factor to thereby provide a compensated iso-foot-candle distribution at each point in the set of points for the number of solid-state lamps at a single location within the array of lighting fixtures. The contributions of each one of the array of lighting fixtures are then summed by summing a contribution of the compensated iso-foot-candle distribution at each point in the set of points over the area to be illuminated for all of the array of solid-state lamps to thereby provide a measure of the level of illumination over the area to be illuminated. The illuminance or light intensity obtained by the above calculations may be then displayed in a contour plot that may be plotted vs. relative coordinates or GPS coordinates to illustrate to a user the illuminance distribution. In this invention, calculations are based on far-field measurements of the whole luminaire and require a single calculation to determine the illuminance, shortening the calculation time by several orders of magnitude compared to ray tracing.

In some embodiments, a method is provided for determining positions for a network of sensors disposed in an array to provide a desired level of sensitivity of the sensors to events within an area in which the events are to be detected. The array may be preferably an array of lighting fixtures, but may also be a dedicated array of sensors, WiFi access points or other devices. The method includes a first step of determining for one of the sensors a sensitivity distribution specifying sensitivity of the sensor at a first set of points within range of that sensor. Then using the sensitivity distribution determined, the method determines at each of a second set of points within the area whether any sensor within the array of sensors provides the desired level of sensitivity to events within the area. The dynamic range of the sensors obtained by the above calculations may be displayed in a contour plot that may be plotted as a function of relative coordinates or GPS coordinates to illustrate to a user the range of the sensors relative to known reference points such as the sensor locations. Finally, to the extent that the desired level of sensitivity to events within the area does not meet the desired level of sensitivity, a step may be performed of adjusting at least one of (i) the number of sensors of the array, (ii) an angle of incidence of one sensor within the array with respect to the area in which the events are to be detected, or (iii) the location of one of the array of sensors within the area in which the events are to be detected.

In some embodiments, a method is provided for determining positions for a network of wireless end points and access points to provide a desired level of connectivity margin in a wireless network. The method includes a first step of determining for each of the access points the maximum distance to end points based on the access point and end point expected receiver margins. The expected receiver margins are based on transmit powers, propagation losses based on the distances between the end points, receiver sensitivities, antenna gains, and estimated penalties for multipath and crosstalk. The range of each access point obtained by the above calculations may be then displayed in a contour plot that may be plotted as a function of relative coordinates or GPS coordinates to illustrate to a user the end points that are within range of each access point. Finally, to the extent that the desired level of receiver margin for each end point may be not obtained, the method includes steps of either moving the access point relative to the end points or adding more access points so that each access point has adequate receiver margin to one or more other access points. In some embodiments, a method is provided for using a common user interface with relative or GPS coordinates to simultaneously or selectively display the calculated light distributions, sensor ranges, and wireless signal strengths. The visual representation of these functions based on expected values may also be refined based on field measurements.

Applications for the system described herein include a networked sensor system for automatically controlling lighting conditions in a group of outdoor or indoor lighting fixtures in response to various detected conditions or detecting events in an area in which coverage may be provided by a system of sensors. In such systems there are important elements, notably, the light emitting devices, the sensors for detecting particular conditions, and the means of communication among devices, whether sensor or emitter. The planning, deployment, management, and troubleshooting of such a networked system may be facilitated by use of software tools to estimate signal strengths of the luminaires, sensors, and wireless networking over the coverage area. In addition, this functionality may be integrated into control software that enables users to provision and monitor lighting, sensors, and wireless networking. This disclosure focuses upon systems that are implemented using networked lighting fixtures. One such system may be described in co-pending United States Provisional Patent Application entitled "Networked Lighting Infrastructure for Sensing Applications," Ser. No. 61/699,968, filed Sep. 12, 2012, the contents of which are incorporated herein by reference.

The electromagnetic wave radiation sources, for example, light or radio (WiFi), and sensors, for example, motion detection or audio) at the deployed luminaires have similar calculations with a $1/R^2$ attenuation. In other words signal strength falls off as the square of the distance R from the emitting source. With a similar file format (modeled after the Illuminating Engineering Society (IES) format), reference files for sensing and emitting devices may be used to calculate and display the iso-foot-candles, sensor sensitivity, and WiFi signal strength. The calculated values as a function of position may be plotted in terms of relative position, or absolute GPS position.

An example of one application of an exemplary system may be compliance with lighting specifications to provide a specific light distribution over a given area, e.g. a parking lot or a roadway. This application may be a new installation or a retrofit of previously installed, lighting system that lacks sensors. In the case of a new installation, the designer may have targets for the light distribution expressed in a format such as (a) the minimum light at all locations (e.g. expressed as foot-candles), and (b) uniformity of light (e.g. expressed as a ratio of the maximum to minimum foot-candles) over the designated area. In the circumstances of retrofitting an existing installation, the design parameters may refer to the pre-existing light distribution, for example, so that the retrofitted installation has a goal of meeting or exceeding the parameters of the previous installation. In either case, a goal may be to have the light distribution not be so bright as to increase the cost of (1) the fixtures themselves (higher-power lights are typically more expensive) and (2) the electrical cost of operating the lights.

In addition to these constraints, the design parameters defining the light distribution may not be fixed in time. For example, there may be a desire for maximum 100% distribution defined for one operational circumstance (quitting time at a factory), but with other target distributions of less than 100% (for example, dimming the lights when the factory may be closed over a weekend). In addition it may be desired to control the lights in response to events from sensor inputs such as person-detection devices and daylight or background light sensors.

Typically, a lighting vendor may determine a "reference" light pattern for a particular fixture at a calibrated test laboratory. This testing produces an IES file that may be used by lighting designers to estimate the light distribution of light fixtures manufactured to be the same as the reference fixture. The calculated light distribution in this procedure may not necessarily match the actual light distribution for a variety of reasons, including: component differences between the reference fixture and the actual fixture(s); dimming conditions; aging of the fixture and illumination source in the fixture; and variations in the height of the poles upon which they are installed.

Various embodiments provide equipment and methods to monitor and display real-time light distributions; measure light distribution before a retrofit and then adjust the installed lights to correspond in a pre-defined manner to the pre-existing lights; optimize in real-time the light distribution to match a specified set of parameters; adjust light distributions to account for luminaire aging; adjust light levels in response to environmental events such as fog, storms, and full moons; and optimize lighting efficacy, e.g. in terms of lumens per Watt of electrical power.

techniques, systems and software for use in placement of sensors, lights, and other components in networked systems.

In particular described are procedures that may be integrated into a graphical user interface to enable design of networked sensor and lighting systems. Embodiment systems provide mapped distributions of (1) light distribution, (2) sensor reach, and (3) wireless signal strength. As will be evident, more generally, it may be used to display other information involving electromagnetic wave emission and detection devices.

FIG. 1 shows a plan view of an exemplary parking lot 10 with an installed LSN showing locations of the walls 11, parking spaces 12, parking sensors 13, networked lights 14, networked lights with integrated occupancy sensors 15, networked lights with integrated cameras 16, wireless access point 17, wireless repeater 18, and ingress points 19. In this example, all lights in the LSN are deployed with an integrated network module that communicates with an access point. Standard wireless or wired protocols may be used to connect each light to the access point, such as WiFi, Bluetooth, or Ethernet. In the exemplary application of FIG. 1, WiFi may be used to connect the network module in each light to an access point 17 that may be standalone or integrated with a light.

Figure 2:
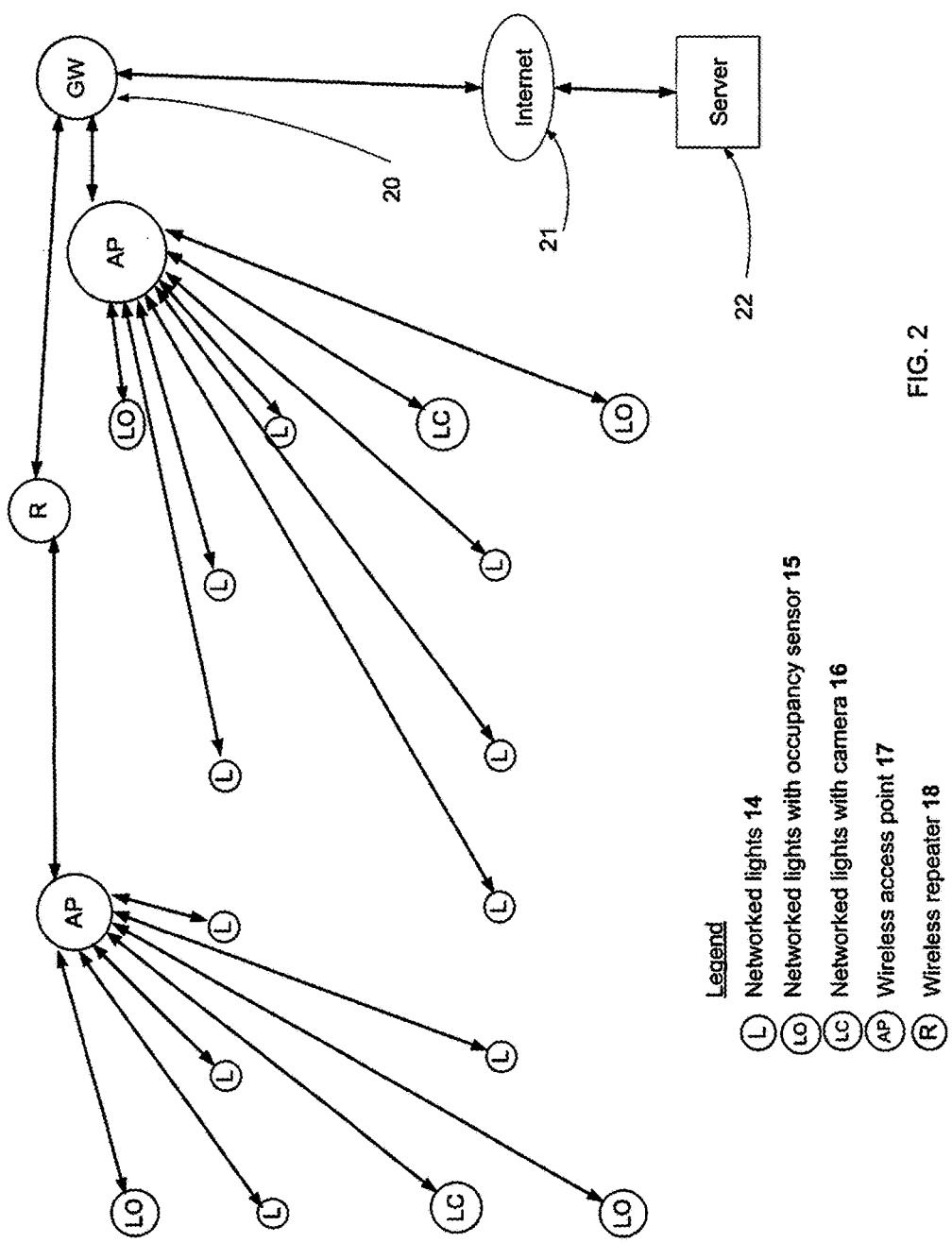
FIG. 2 is a logical diagram of the network connections between lighting network nodes and the remote server for the exemplary parking lot shown in FIG. 1.

FIG. 2 shows a logical network connection diagram for the exemplary LSN shown in FIG. 1. The access points 17 connect over the internet 21 to a remote server 22 via a gateway node 20. Standard gateway protocols such as cellular service, WiFi or wired Ethernet may be used to connect to the internet. If the gateway node is beyond the range of the access point, then a network repeater 18 may be used to relay the communications between the access point and the gateway node. With the network connections providing a communications path from the server 22 to all lighting nodes, the server may have software that may be used to monitor and control the light levels and read, store, and display the sensor data.

Figure 3:
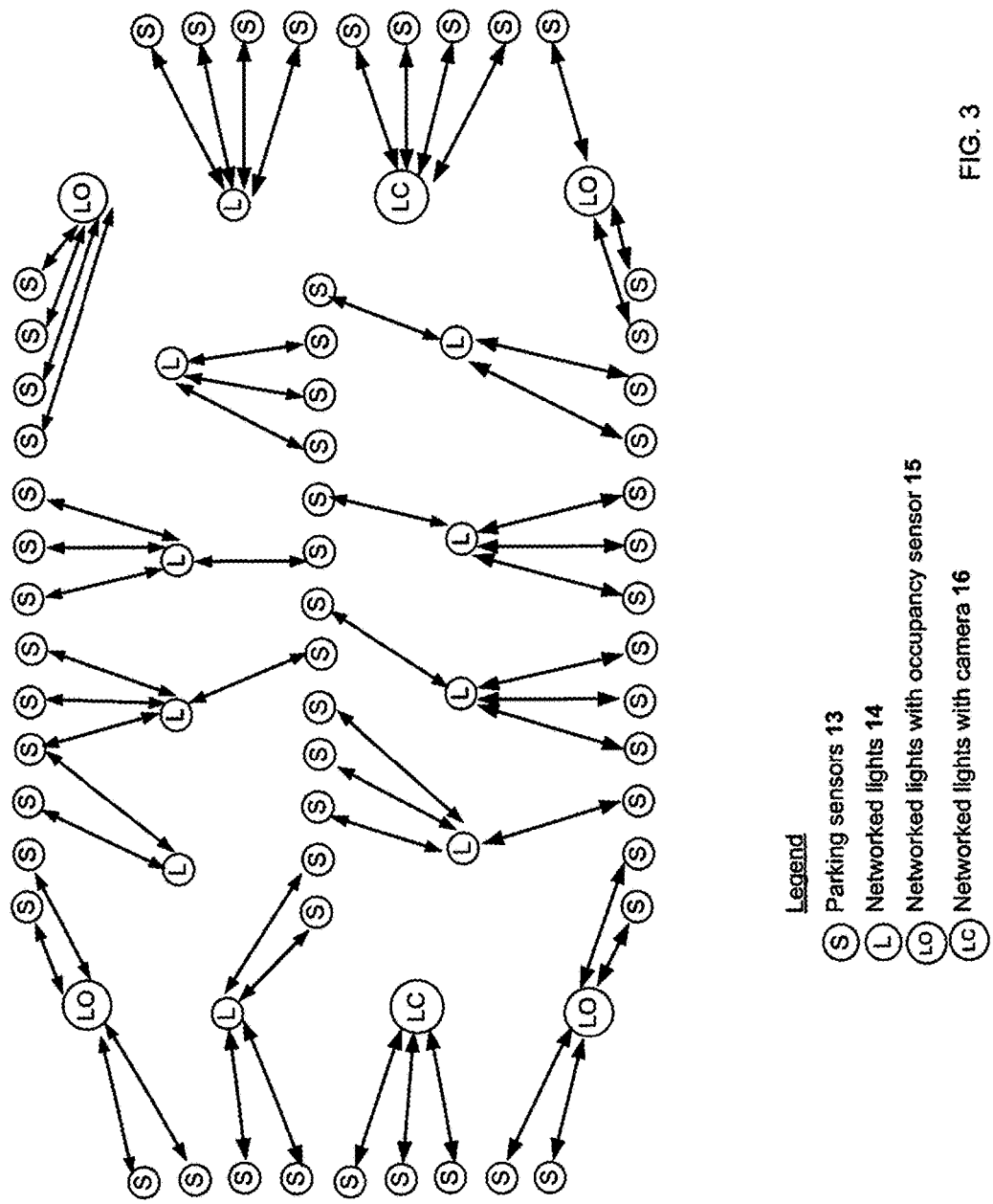
FIG. 3 is a logical diagram of the network connections between remote sensor network nodes and lighting network nodes for the exemplary parking lot shown in FIG. 1.

The LSN also supports remote sensor modules that are not integrated with the light. For the remote sensors, a network transceiver within the sensor communicates with a network transceiver within a neighboring light. Standard wired or wireless networking protocols, such as Bluetooth, Zigbee, RS-485 or CAN, may be used for the remote sensor communications. FIG. 3 shows a logical network diagram for the network connections between the network transceivers in each remote sensor module 13 and associated light 14. Software running on each light reads the sensor data of its associated remote sensor modules 13 via the network connections shown in FIG. 3, and software running on the remote server 22 reads the sensor data on the remote sensor modules 13 via the communication network to each light shown in FIG. 2. Sensor nodes are typically connected to the nearest networked lighting node, with some limitations on the number of sensor nodes per light that depends on the networking protocol used.

Figure 4A:
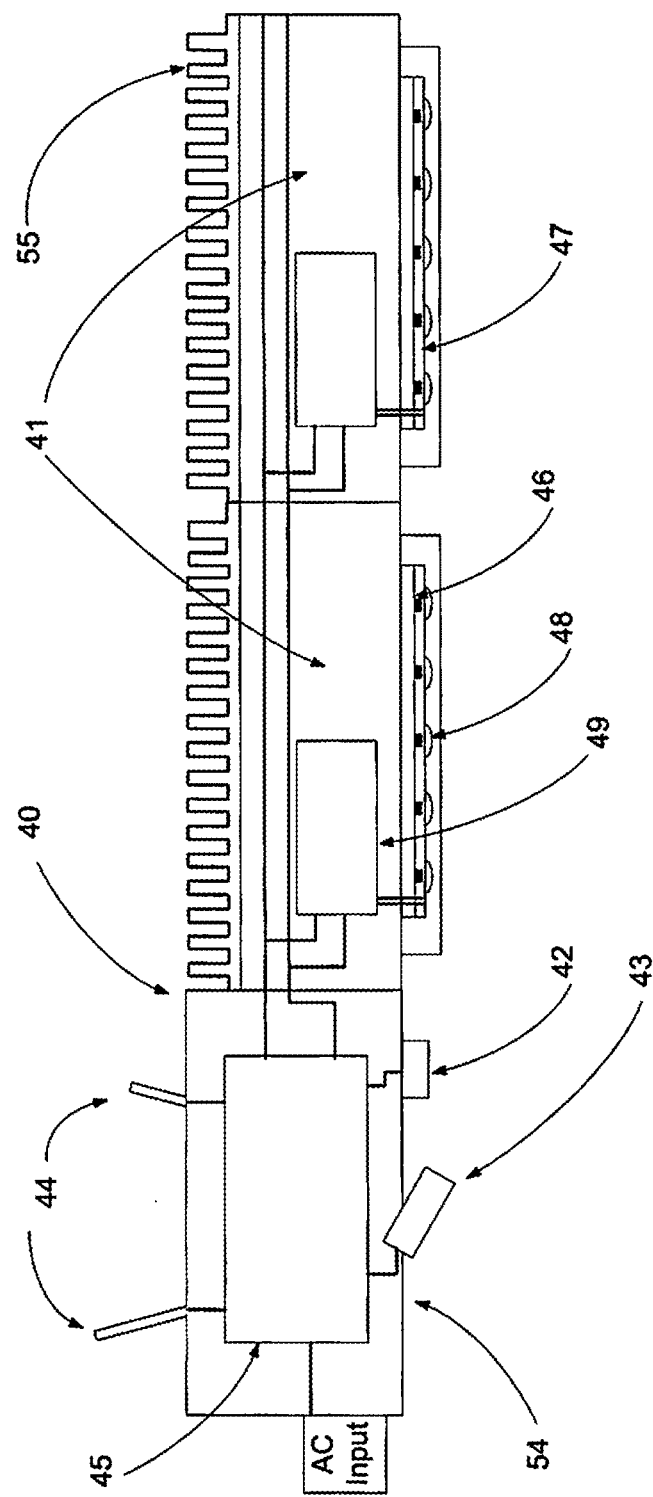
FIG. 4A is a side view cross sectional diagram of components of an LSN node with LED modules, network nodes, and sensors.
Figure 4B:
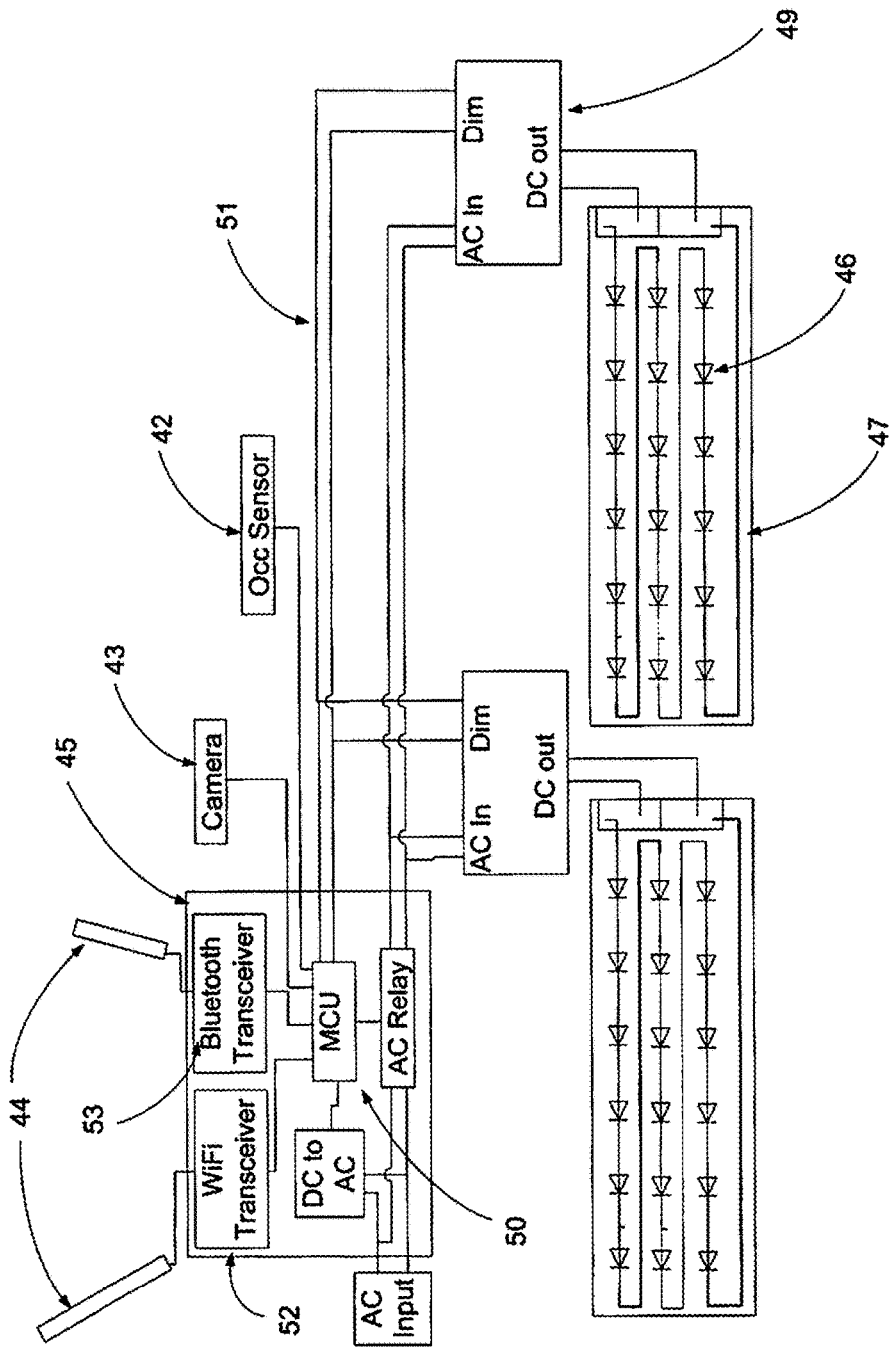
FIG. 4B is a wiring diagram of the LSN node shown in FIG. 4A.

FIG. 4A shows a cross-section diagram of an LSN light 40 with two LED modules 41, an occupancy sensor 42, security camera 43, wireless RF antennas 44, and control unit 45 with integrated wireless transceivers. Each LED module has a plurality of white LED chips 46 mounted on a printed circuit board (PCB) 47 with a lens array 48 to direct the LED light in a required light distribution. FIG. 4B shows the wiring diagram for the LSN light shown in FIG. 4A. The microcontroller unit (MCU) 50 on the control unit 45 controls a 0-10V signal that may be sent over a dimming bus 51 to each LED driver 49 that controls the constant current to the LED PCB. In this example, the MCU 50 receives sensor signals from the occupancy sensor 42 and camera 43 and transmits to the access point via a WiFi transceiver 52. A Bluetooth transceiver 53 may be used to transmit to the remote sensors. The LED driver, LED modules 41, control unit 45, wireless antennas 44, camera 43, and sensors 42, are packaged in a closed housing 54 with appropriate heatsinks 55.

Figure 5A:
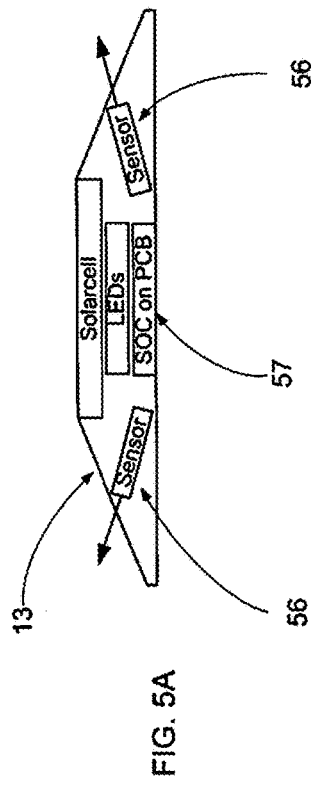
FIG. 5A is a side view cross sectional diagram of a remote sensor node.
Figure 5B:
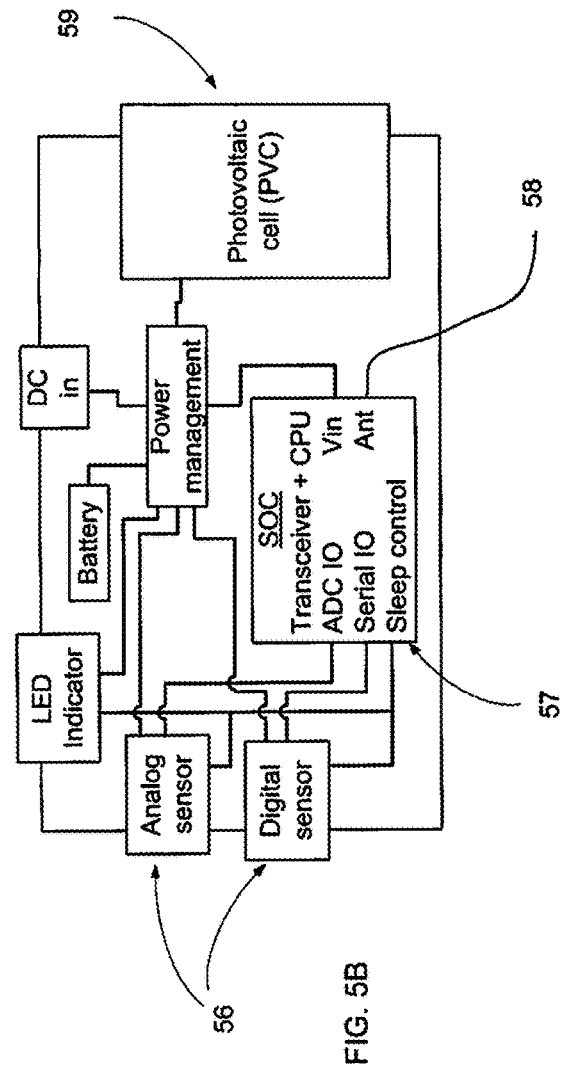
FIG. 5B is a component block diagram of the remote sensor node shown in FIG. 5A.

FIG. 5A shows an exemplary cross-section diagram of a remote sensor module 13. The remote module has sensors 56 with analog or digital outputs that are connected to an integrated system on a chip (SOC) 57. An SOC, such as the Texas Instruments CC2541 or Enocean STM300 combines in a single integrated circuit a wireless transceiver, analog and digital sensor interfaces, and a CPU with volatile and non-volatile memory. The wireless transceiver in the remote sensor module transmits to a compatible transceiver in a neighboring light over the air using a wireless antenna 58. The access point may receive the signal from one or more remote modules with its wireless antenna connected to a compatible SOC. The MCU in the light receives the information in the remote sensor signals and (a) stores the information locally, (b) retransmits the data to the back-end server over the internet using one or more standard protocols such as WiFi, cellular radio, or Ethernet, and/or (c) sends a command message to one of the remote sensor modules.

Most cases of remote sensor modules are low power so that they may be powered by (a) an AC/DC power supply that may be shared between one or more sensors, (b) an onboard battery, or (c) a photovoltaic cell (PVC) 59 or other energy harvesting means. In one embodiment, PVCs coupled to the sensor modules are pointed at the available artificial or natural lights. The SOC on the remote sensor and indicator module may be designed to operate at low power such that it may be battery powered for extended periods.

We now turn to the methods of system design for the LSN based on the exemplary system and components described herein. The first aspect of system design may be selecting the LED modules to provide the required lighting distribution. Referring to FIG. 4A, the light distribution of an LED luminaire may be modified by changing the number of LED modules 41, changing the LED lens array 48, or changing the LED drive current by means of the dimming signal sent from the MCU 50 over the dimming bus 51.

Figure 6:
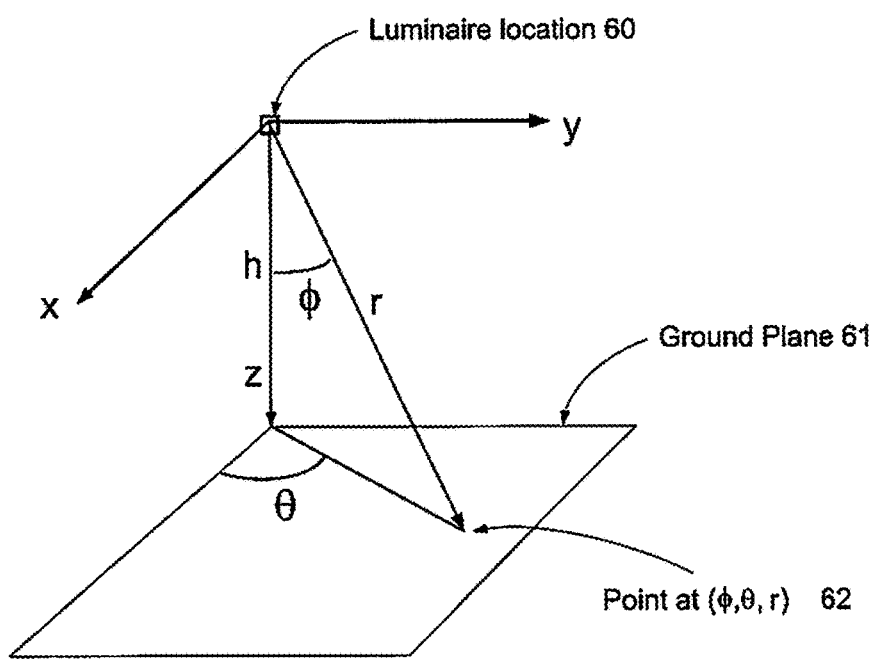
FIG. 6 is a perspective view of a spherical and Cartesian coordinate systems used in the calculation of light, sensor, and RF signal intensities.

In some conventional techniques, calculations necessary for design of lighting systems are performed using ray tracing (U.S. Pat. No. 8,619,079). This is a computer-intensive method that requires a summation of the contribution of a multitude of rays from each individual luminaire to determine the illuminance at a given point. In this invention, the illuminance at select surfaces, such as the ground, is calculated from standard IES (Illuminating Engineering Society) files that tabulate, for a luminaire at the center of a spherical coordinate system ($\varphi$, $\theta$, 0), the luminous intensity, Cd, in units of Candelas versus the angular direction from the luminaire. In a properly formatted IES file, the luminous intensity values versus angle are written as an array with $\varphi$ increasing across the columns, and $\theta$ increasing down the rows. FIG. 6 illustrates the spherical coordinate system that may be used with IES files to describe the luminous intensity of a luminaire versus the viewing angle from the luminaire location. In this coordinate system, $\varphi$ is the vertical angle ($\varphi=0$ is straight down from the light), and $\theta$ is the horizontal angle. The relationship between Cartesian and spherical coordinate systems is defined by equations 1-3 as follows:

$$\varphi(\text{radians}) = \text{ATAN}(\text{SQRT}((x^2+y^2)/z)) \quad \text{Eq. 1}$$

$$\theta(\text{radians}) = \text{ATAN}(y/(x)) \quad \text{Eq. 2}$$

$$r = \text{SQRT}(x^2+y^2+z^2) \quad \text{Eq. 3}$$

On the ground plane 61 at the point that is a distance r and at angles ($\varphi$, $\theta$) from the luminaire 62, the light intensity in foot-candles is given by equation 4 as follows:

$$Fc(\varphi,\theta,r) = Cd(\varphi,\theta)\cos\varphi/r^2 \qquad \text{Eq. 4}$$

For a given luminaire with IES file that provides a table of Cd ($\varphi$, $\theta$) values and a specified mounting height, h, the foot-candle distribution on the ground may therefore be calculated and plotted in a Cartesian coordinate system on the ground under the luminaire. A contour plot of lines with equal foot-candles ("iso-foot-candles") may be then calculated by interpolating the calculated foot-candle values using well-known mathematical methods.

Figure 7A:
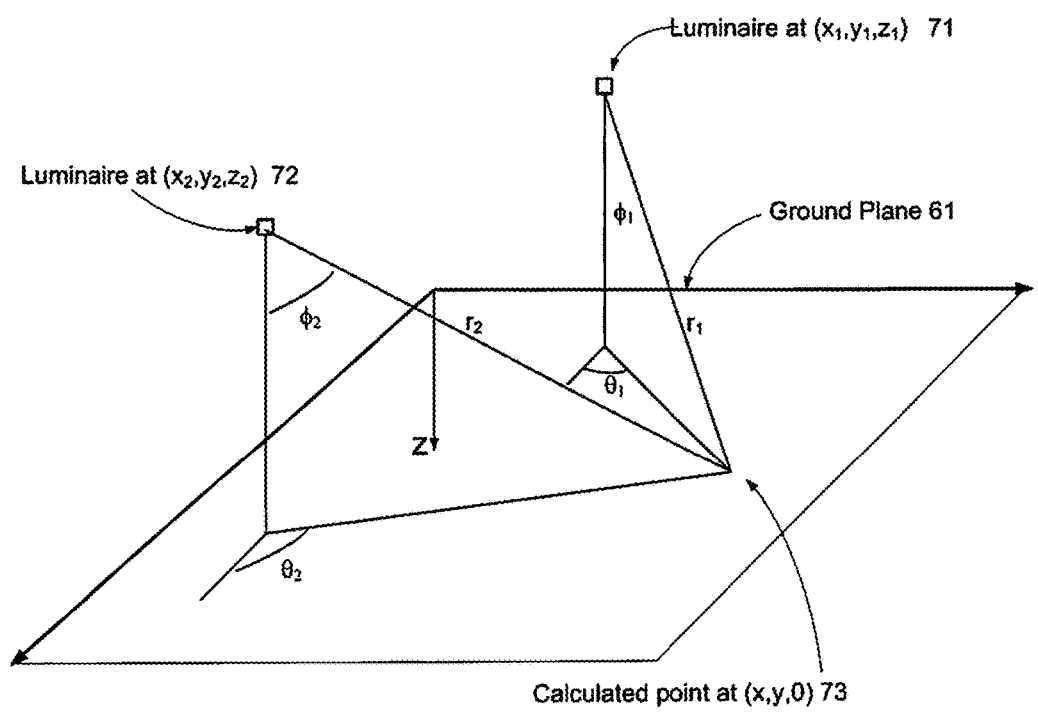
FIG. 7A is a perspective view of a translation of local coordinates to global coordinates for calculation of light, sensor, and RF signal intensities.

Because illumination light may be non-coherent, both iso-candelas and iso-foot-candles may be linearly scaled depending on the number of lighting elements in a luminaire, such as the number of light emitting diodes (LEDs) or lightbulbs. And, the total foot-candle illumination at any location in a lighted area may be calculated by summing the contribution of all luminaires at each calculation point in a grid covering the area. The foot-candle distribution of multiple lights may be done by translating the local coordinate system of each luminaire onto a global coordinate system as shown in FIG. 7A for an example of a luminaire at position ($x_1$, $y_1$, $z_1$) 71 and a luminaire at position ($x_2$, $y_2$, $z_2$) 72 in a coordinate system with z=0 at ground level.

Then for each position on the ground (x, y, 0) 73 operations to be performed may include the following steps:

Step 1. Convert the position from (x, y, z) coordinates to spherical coordinates relative to light k using equations 5-7 as follows:

$$\varphi_k(\text{radians}) = \text{ATAN}(\text{SQRT}((x-x_k)^2+(y-y_k)^2)/z_k) \qquad \text{Eq. 5}$$

$$\theta_k(\text{radians}) = \text{ATAN}((y-y_k)/(x-x_k)) \qquad \text{Eq. 6}$$

$$r_k = \text{SQRT}((x-x_k)^2+(y-y_k)^2+z_k^2) \qquad \text{Eq. 7}$$

In the calculations of Eq. 6 and Eq. 7, checks are made to assure no division by zero occurs, and to determine the quadrant of each angle.

Step 2. Interpolate the IES file to obtain the candelas at the angles ($\varphi_k$, $\theta_k$)

Step 3. Scale the interpolated candela value by a scaling factor $S_k = n_k D_k$ where $n_k$ may be the number of LED arrays and $D_k$ may be the illuminance dimming factor (0 to 100%) of the light Step 4. Calculate the foot-candle contribution from the luminaire by using equation 8 as follows:

$$Fc(x,y,z) = S_k Cd(\varphi_k, \theta_k)\cos\varphi_k/r_k^2 \qquad \text{Eq. 8}$$

Step 5. Repeat the calculations in steps 1-4 for each luminaire.

Step 6. Sum over all lights to obtain net foot-candles at point (x, y, 0).

The net foot-candle distribution on the ground may be calculated as described in steps 1 to 6 for a grid of points in the ground plane. A contour plot of lines with equal foot-candles ("iso-foot-candles") may be then calculated by interpolating the calculated foot-candle values and plotted in the ground plane.

Figure 7B:
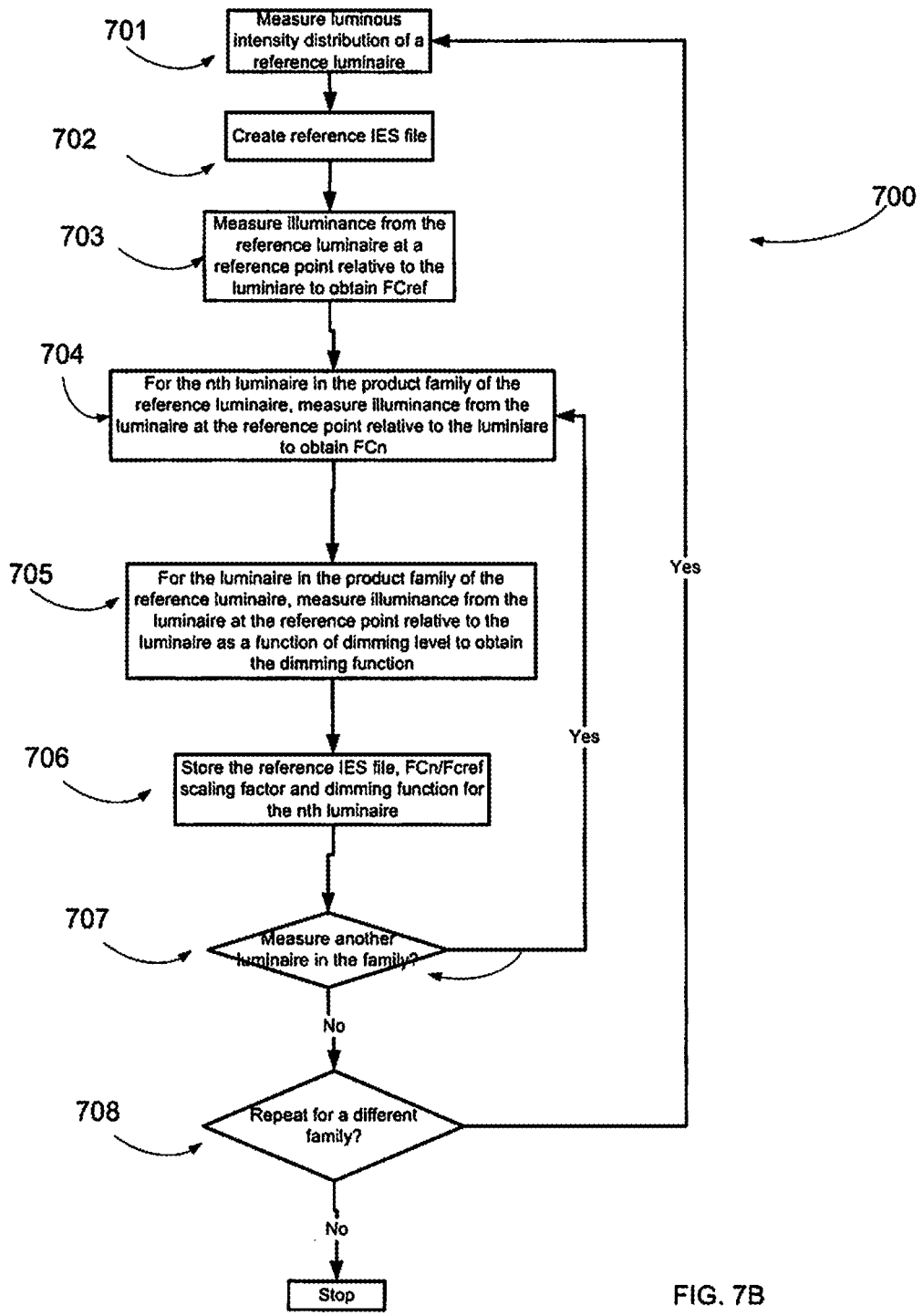
FIG. 7B is a process diagram for measuring the scaled IES files of luminaires

A simplified method for calibration of luminaires may also be needed. A full determination of the IES files for a reference luminaire may be costly and time consuming, since it may be typically done over several hours with a large goniophotometer. The method described here to calibrate a family of luminaires assumes that luminaires of the same family have the same light distribution shape. This may be generally valid for lensed luminaires such as LEDs. In this case, it may be assumed that luminaires in the same family may have different total output power levels so that the light distribution of any luminaire may be found by scaling the distribution of the reference luminaire. Process flow diagram in FIG. 7B illustrates the following steps of an embodiment method 700 that may be performed by a processor of a computing device (or computer):

In step 701 measure the Candela distribution of a reference luminaire, using a goniophotometer for example, to obtain an IES file (step 702). (Other file formats such as the EULUMDAT format may also be used). In step 703 measure the same reference luminaire with a calibrated, low-cost foot-candle meter at a fixed distance and orientation from the reference luminaire. The fixed distance and orientation may be, for example, the point of highest light flux at a fixed distance from the reference luminaire. This measurement establishes the reference foot-candles for the reference light (FCref). At step 704, for the nth factory-made luminaire with the same light distribution shape as the reference luminaire, measure the foot-candles with the same meter at the same distance (FCn). At step 705, for the nth factory-made luminaire, measure the foot-candles using the same meter as a function of the dimming level to get the dimming function of relative light level vs. dimming setting. At step 706 the reference IES file, scaling factor, and dimming function are stored in software along with an identifying parameter for of the nth luminaire, such as serial number or product code. At step 707, the steps 704, 705, and 706 may be repeated for other luminaires with the same light distribution shape as the reference luminaire; and at step 708 the entire process may be repeated for lights with a different light distribution shape.

This method provides calibration files stored in software to enable determination of the light distribution of every factory-calibrated luminaire versus its dimming level. Storing the calibration files requires less memory space than storing the IES of each luminaire at different dimming levels, since only one IES file is stored for all luminaires in the same family since the method assumes that all luminaires in the same family have the same light distribution, but with different scaling factors.

Figure 7C:
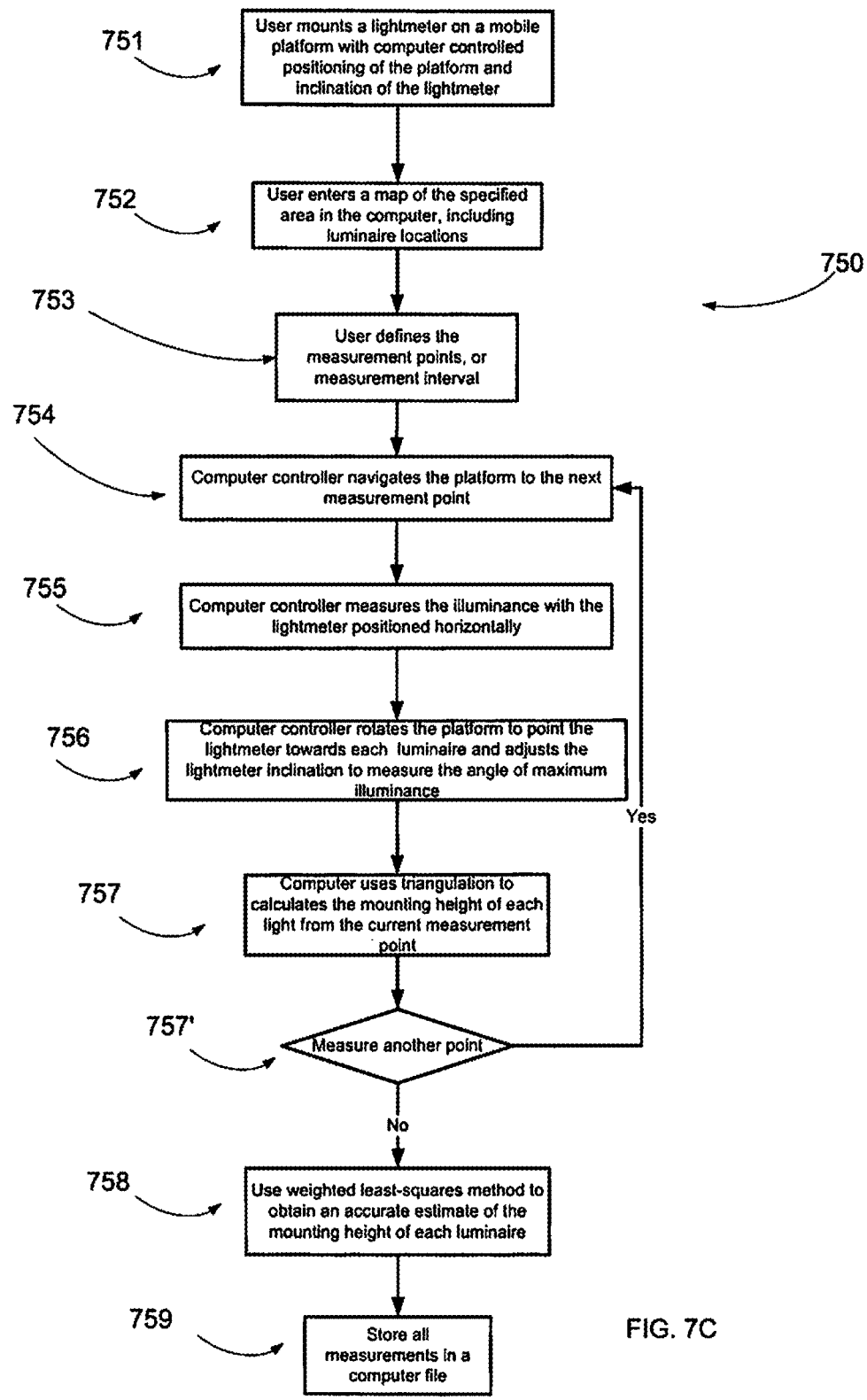
FIG. 7C is a process diagram for an automated measurement of illuminance distribution over a specified area.

For circumstances when a lighting system may be retrofitted, e.g. with LED replacement of incandescent bulbs, it may be desirable to measure the existing light distribution so that the retrofit lighting may be designed to match or exceed the current light distribution. This may be done in the field with a hand-held or robotic photometric measuring system. An embodiment implementation may be based on a base platform for a robot that may be programmed and controlled wirelessly. A process flow diagram is shown in FIG. 7C for this embodiment method 750. In various embodiments, a processor of a computing device (or computer) may be configured to perform the various steps of the method 750. At step 751 the user mounts a lightmeter on a mobile platform that has computer controlled positioning, the vertical angle (inclination) of the lightmeter also being computer controlled. At step 752 the user enters a map of the specified area in the computer that includes the luminaire locations, and at step 753 the user defines the measurement points, or the measurement interval. The computer then navigates the platform to each measurement point (step 754) and measures the illuminance with the lightmeter positioned horizontally (step 755) to obtain the total illuminance in foot-candles. At step 756 for each luminaire the computer rotates the platform to point the meter at each luminaire in turn, and measures the inclination angle of the lightmeter that gives maximum illuminance. At step 757 this angle is used to obtain one estimate of mounting height for each luminaire at each measurement point. The computer may continue with the operations in step 754 in response to determining to measure another point with the operations in step 757'. After all points are measured (i.e., the computer determines there are no other points to measure at step 757'), the computer uses a weighted least-squares method to obtain an accurate estimate of the mounting height of each luminaire (step 758) and the mounting heights along with the measured illuminance at each point are stored in an output file. This data may be fed into a graphical map of measured light distribution that may be overlain on a graph of the specified (or upgraded) light distribution.

Figure 8:
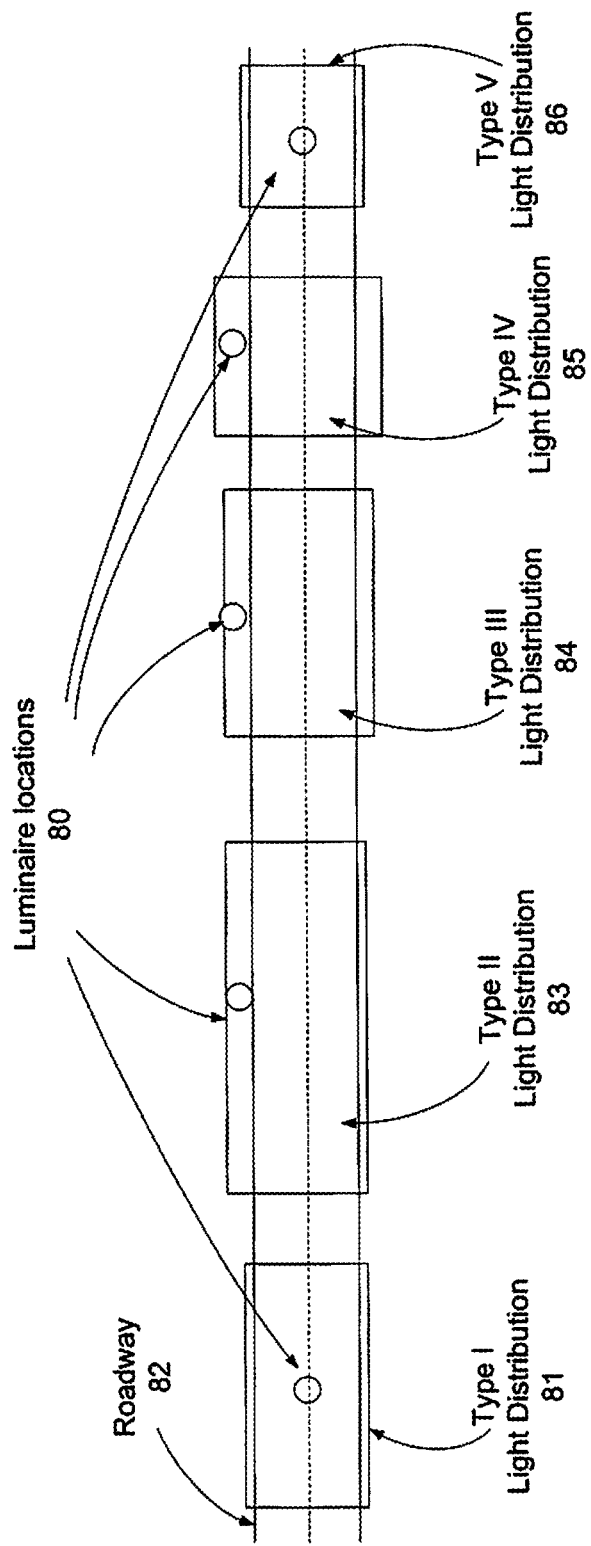
FIG. 8 is a top view of standard roadway lighting distributions.

Before installing the calibrated lights at known locations, the calibrated files for each luminaire may be used to plot the actual lighting distribution vs. the dimming control signal at each light. The target dimming levels may then be calculated for each light to determine the optimum light distribution, dependent on matching the previous distribution, or other design targets. As mentioned above, LED modules may have lens arrays designed to produce different lighting distributions. For example, the IES defines different roadway lighting distributions. FIG. 8 shows a plan view of the five categories of roadway lighting distributions as defined by the Illumination Engineering Society of North America (IESNA). Type 1 illumination 81 is a rectangular distribution below the luminaire 80 that spreads the light along the length of the roadway 82. Type II illumination 83, Type III illumination 84, and Type IV illuminations 85 spread the light along the length of the roadway, but with some forward throw so as to light the roadway in front of the luminaire for applications where the luminaire may be mounted on the side of the roadway. Type II, III, and IV differ in the spreading of light along the roadway as shown in FIG. 8. Type V illumination 86 spreads the light evenly in a square pattern underneath the luminaire. Luminaire manufacturers have different product models that provide the different lighting distributions. Furthermore, for a certain IESNA category, luminaire manufactures have different models to provide varying amounts of lumens, and to provide different degrees of lateral spreading of the light.

Figure 9:
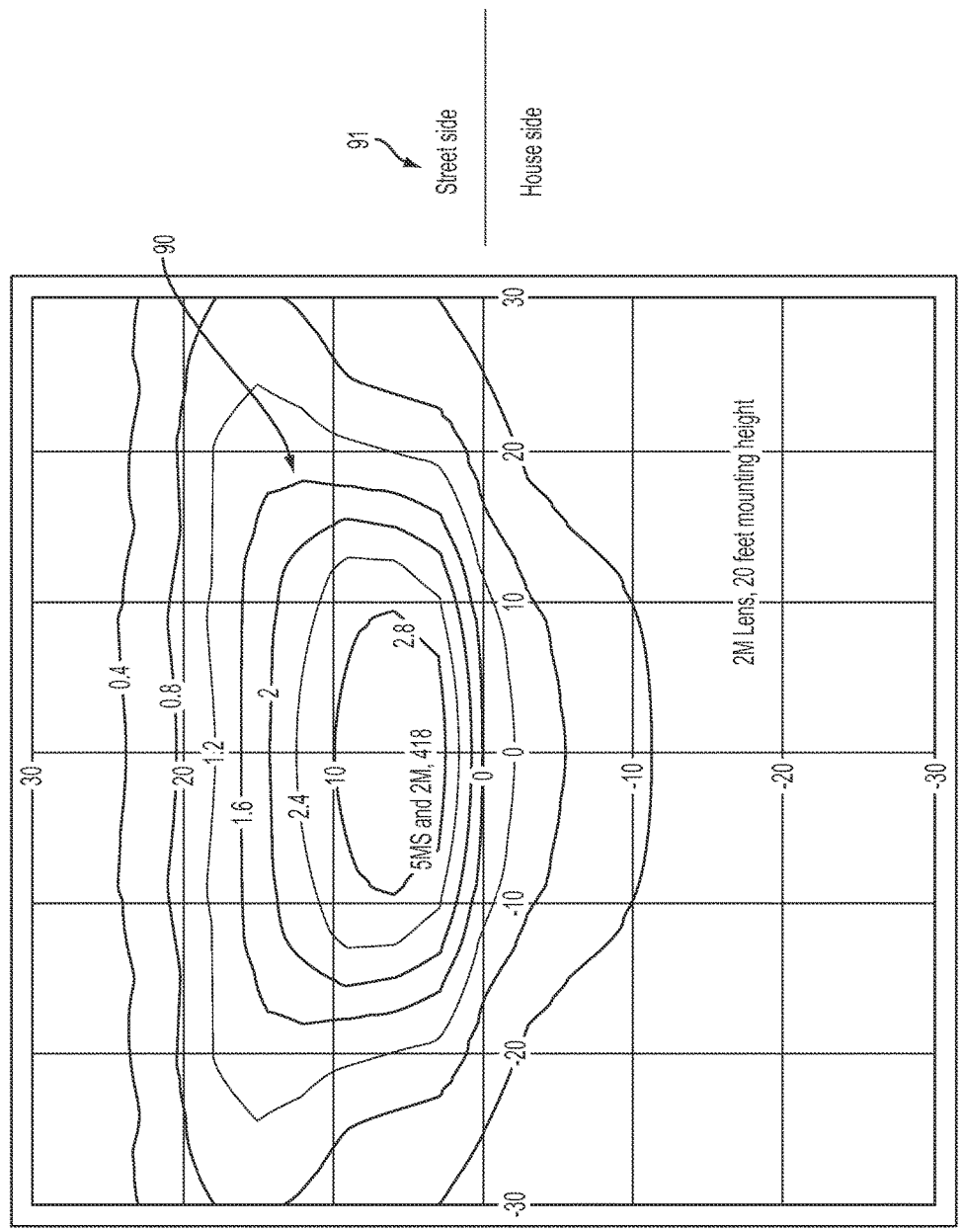
FIG. 9 is a contour plot of the foot-candles on the ground from a 40-Watt LED luminaire with Type II roadway lenses at twenty feet mounting height.
Figure 10:
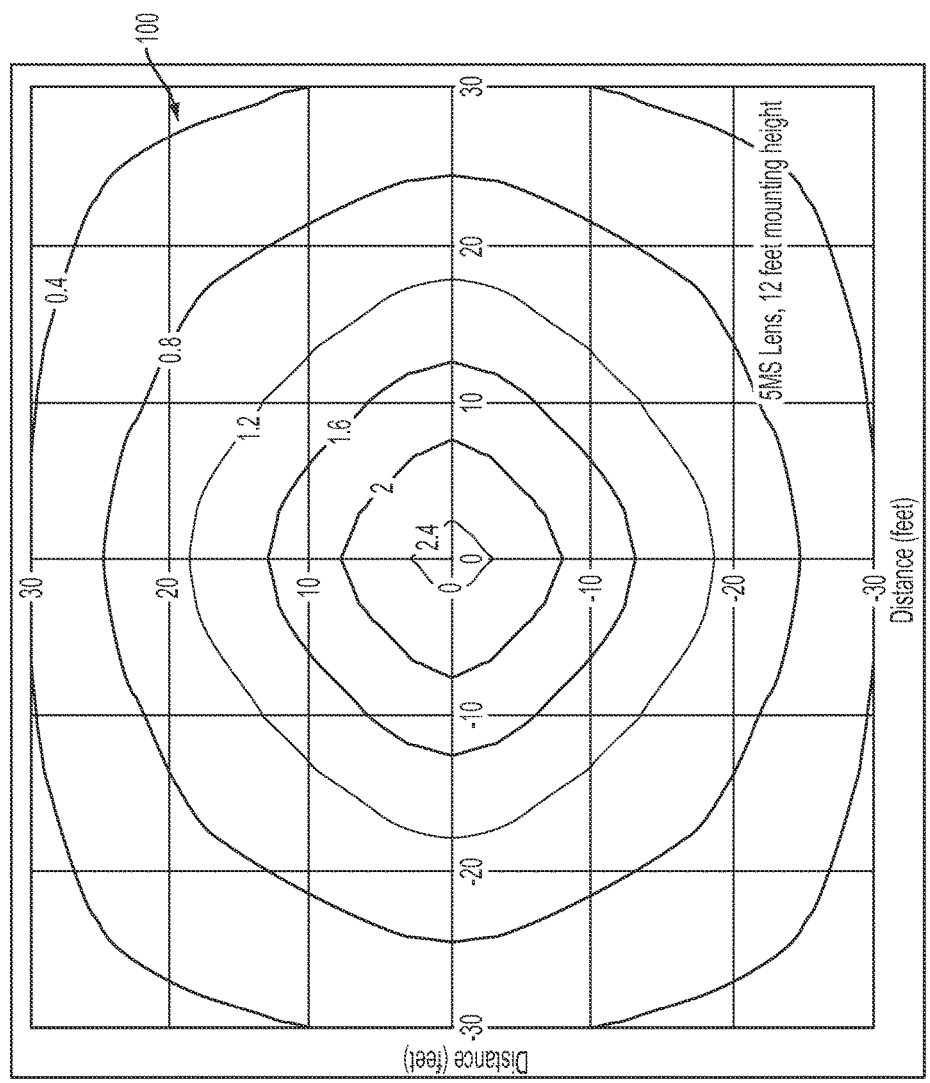
FIG. 10 is a contour plot of the foot-candles on the ground from a 40-Watt LED luminaire with Type V roadway lenses at twelve feet mounting height.
Figure 11:
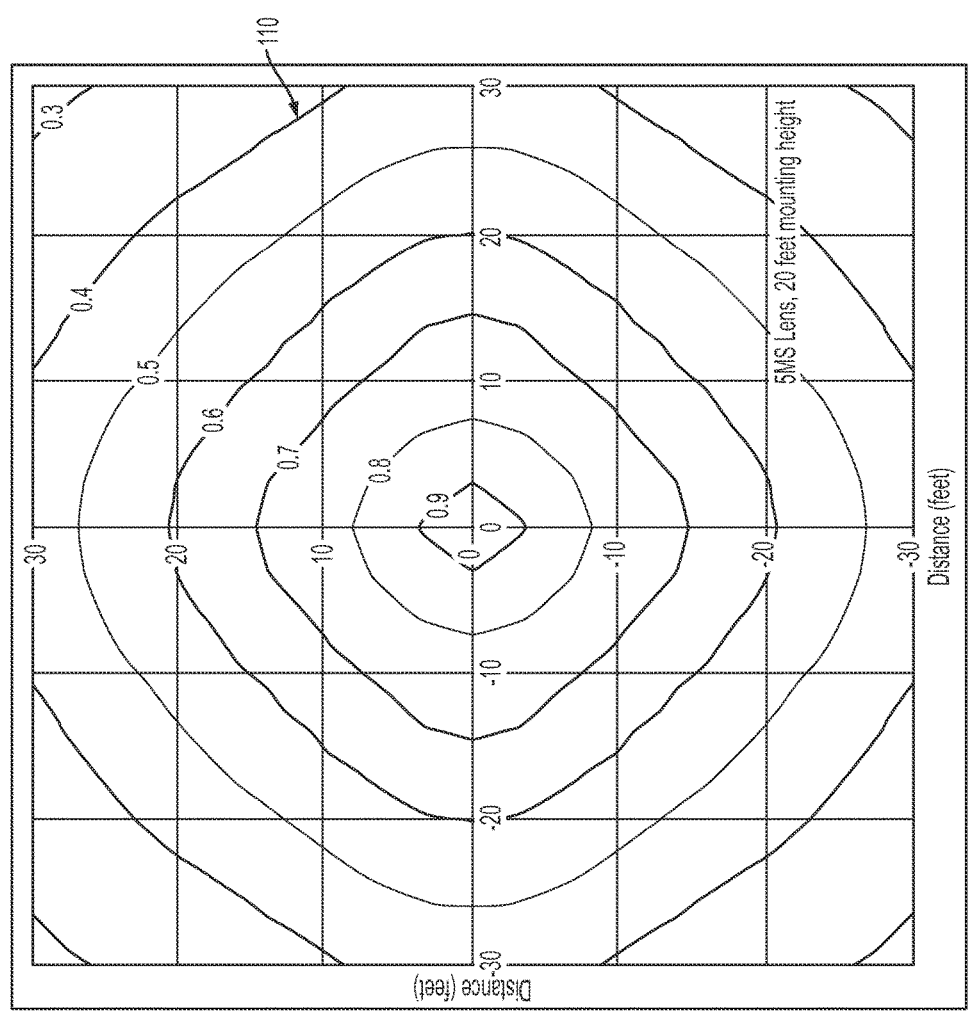
FIG. 11 is a contour plot of the foot-candles on the ground from a 40-Watt LED luminaire with Type V roadway lenses at twenty feet mounting height.
Figure 12:
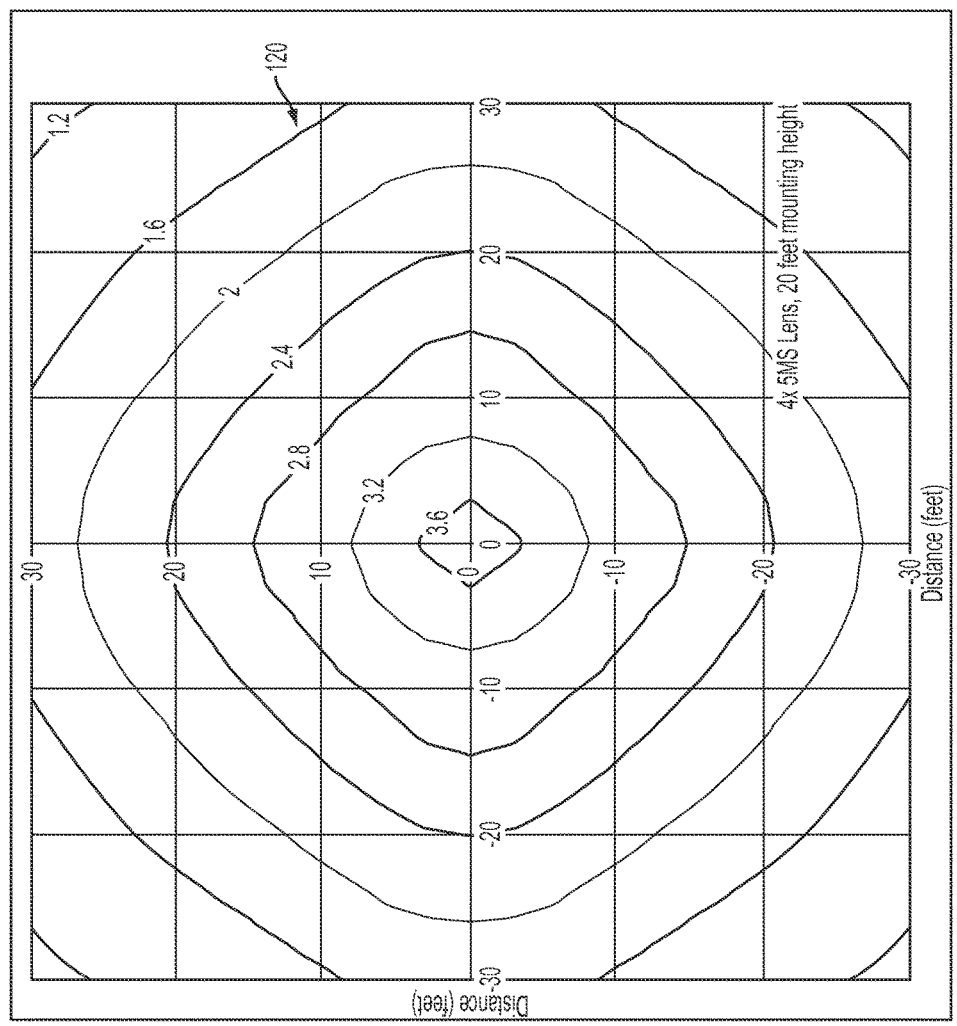
FIG. 12 is a contour plot of the foot-candles on the ground from a 160-Watt LED luminaire with Type V roadway lenses at twenty feet mounting height.

FIG. 9 shows the iso-foot-candle plot 90 of a 40-Watt LED module manufactured by the assignee with Type II lenses mounted at twenty feet above the road at position (0, 0, 20). This plot was obtained using the methods described above to calculate foot-candles from the Candela values in an IES file. As expected for a Type II distribution, the light is spread along the roadway from left to right with more light on the street side 91. Calculated in the same manner, FIG. 10 shows the iso-foot-candle plot 100 of a 40-Watt LED module with Type V lenses mounted at twelve feet above the road at position (0, 0, 12). In this case, the light is spread in a square-like pattern as shown by 86. FIG. 11 shows the iso-foot-candle plot 110 for the same 40-Watt, Type-V LED module mounted at a height of twenty feet above the road at position (0, 0, 20). The shape of the iso-foot-candle distribution 110 for twenty feet mounting height has the same shape as the iso-foot-candle distribution for twelve feet mounting height, with the intensity of light decreases as the mounting height increases. FIG. 12 shows the contour plot 120 when the light for the Type V luminaire at twenty feet mounting height has been increased by adding three LED modules. The resultant light distribution (as shown by contour plot 120) from the 160-Watt, Type-V luminaire has the same shape as 110, with four times higher intensity.

The array of foot-candle values compared to the x, y position may be plotted in a contour plot with iso-lines as shown in FIG. 2. Each curve (e.g., 10, 12, etc. in the diagram represents a set of points of constant illuminance on the ground at that location. The effect of dimming of each light, controlled by adjusting the electrical current driving the light, may also be calculated and plotted if the dimming factor (percentage of luminous flux relative to the value at full current) is known.

The method described herein may therefore calculate and display the lighting distribution for any luminaire given the luminaire IES file and mounting height. The light distribution may be scaled linearly based on the number of LED modules or the dimming current. Scaling may be done to adjust the number of LEDs or dimming current by using the standard IES file to calculate the distribution at a given target point, calculating the ratio between the calculated intensity and target intensity, and applying the ratio to the number of LEDs or driving current. If a light may be tilted or rotated relative to the position used in the IES file definition, the Candela and foot-candle values may be obtained from the IES file using known techniques of coordinate system transformation. Those skilled in the art will recognize that the localized Cartesian coordinate system may be converted to GPS (Global Positioning System) coordinates if the GPS position of any point in the local coordinate system is known.

Note that this method does not account for degradation of the lights caused by component aging, dust, dirt etc. Matching lighting levels over time requires an external sensor be installed adjacent to each light, ideally oriented so that it only measures a single light. This sensor may record a start of life value that may be used as a relative reference to measure the light degradation. Alternatively, a constant aging factor may be applied, such as a degradation of three percent per year.

Figure 13:
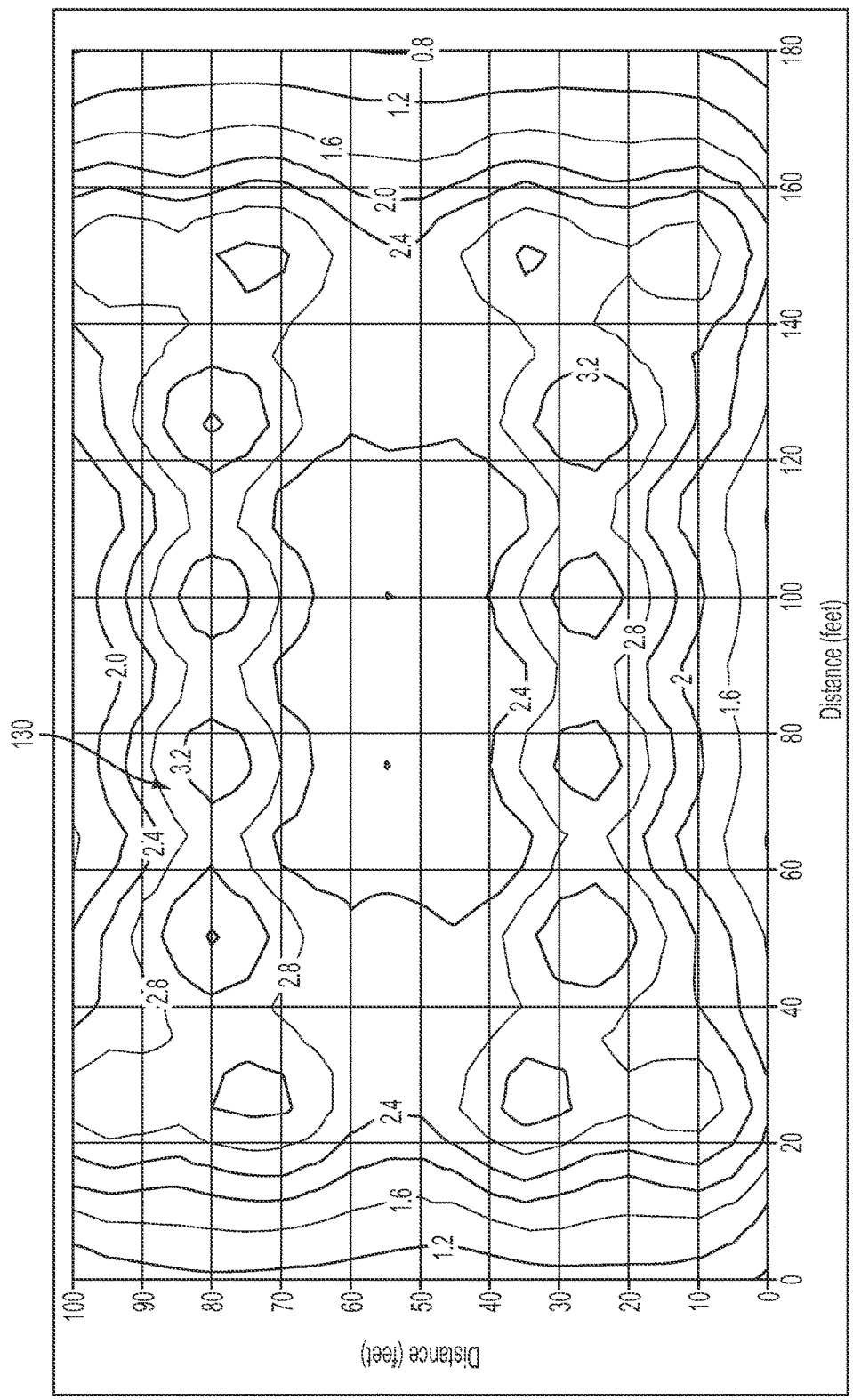
FIG. 13 is a contour plot of the foot-candle distribution for the exemplary parking lot in FIG. 1 with a 40-Watt LED Type V LED module at each lighting location.
Figure 14:
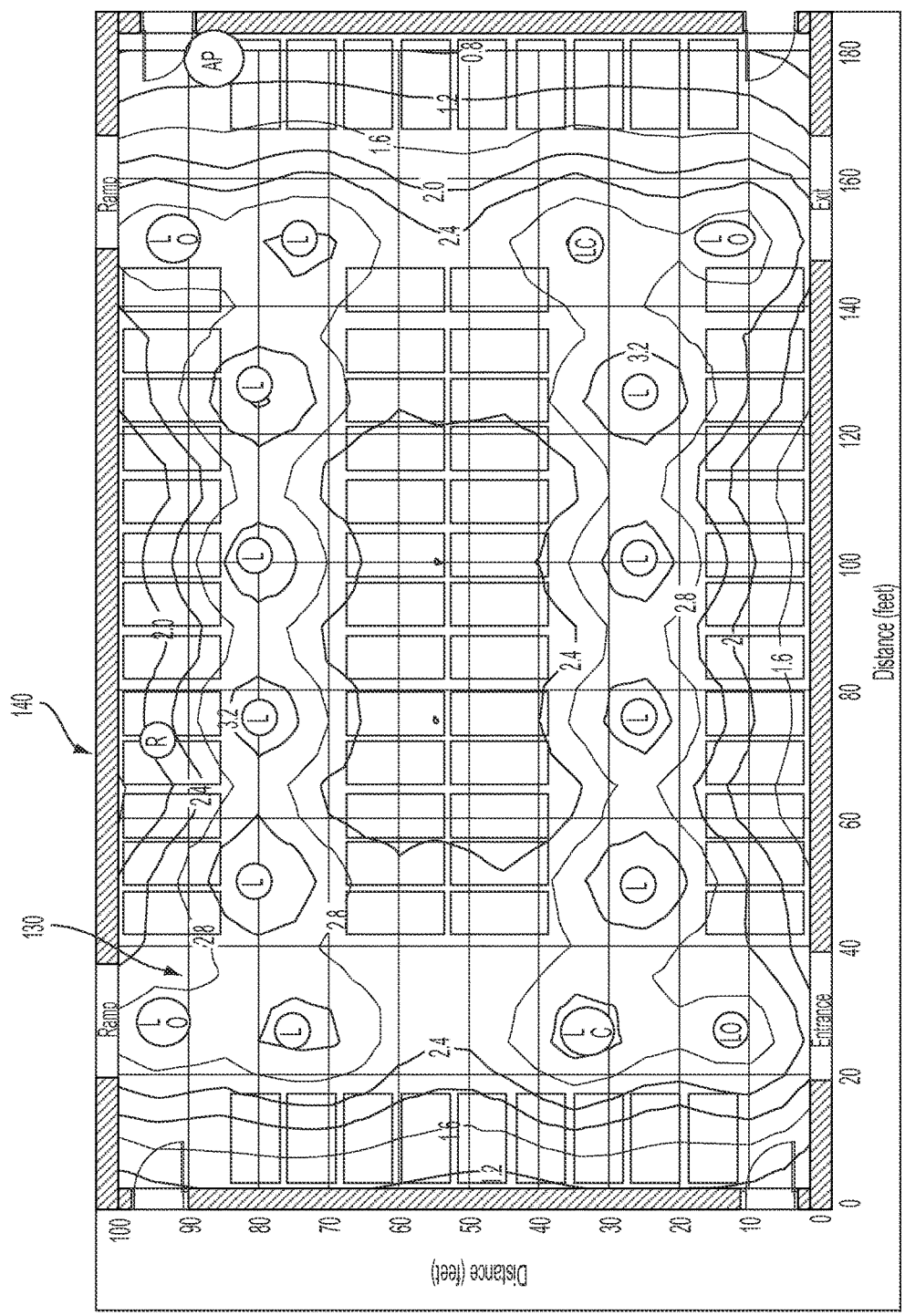
FIG. 14 is a schematic top view of a superposition of the light distribution contour plot from FIG. 13 and the facilities and luminaire location map of the exemplary parking lot in FIG. 1.
Figure 15:
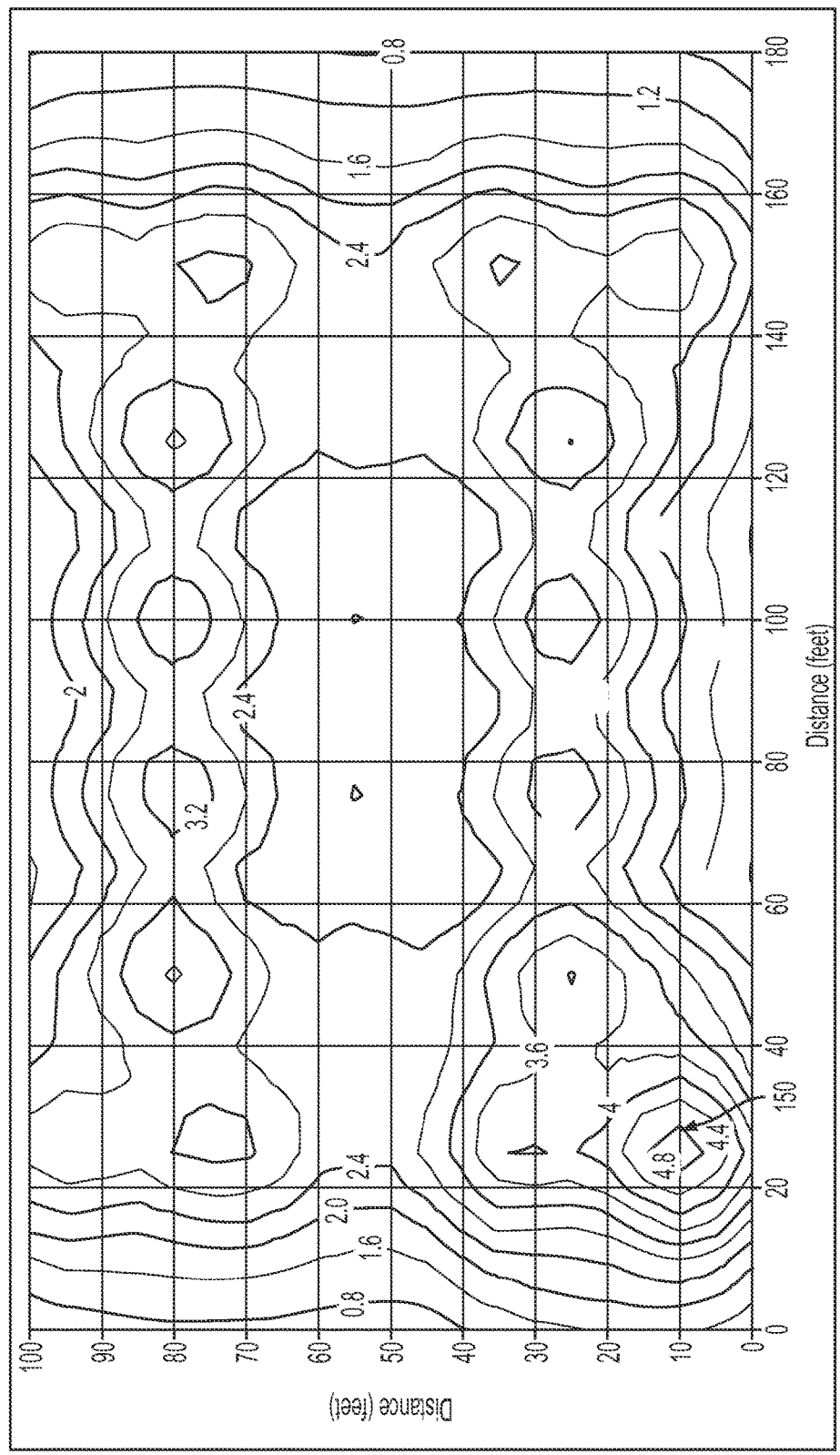
FIG. 15 is a contour plot of the foot-candle distribution for the exemplary parking lot when an 80-Watt Type V LED module is placed at the parking lot entrance.

FIG. 13 illustrates application of the methods described above to calculate the iso-foot-candle lighting distribution 130 for the parking lot example from FIG. 1. In this example, the luminaires are 40 W, Type V with the individual distribution shown in FIG. 10. The calculated foot-candles in the specified area may be used to determine overall parameters for the light distribution, such as minimum, maximum, and average intensity, and uniformity defined by the ratio of minimum to maximum. FIG. 14 illustrates how a software tool based on this technique may overlay the calculated iso-foot-candle distribution 130 on the facility map 140 with specified light locations. Other symbols in FIG. 14 may have the same meaning as in FIG. 1. From the displayed light distributions and calculated parameters the system designer may determine if the selected luminaires meet the system requirements. If the lighting level is too low in some area, such as a dark corner, the number of LED modules may be increased in the nearby luminaires; and if the lighting level is too high in another area, such as in neighbor's yards, the LED current may be reduced by changing the dimming level. FIG. 15 shows an example of this where a second LED module has been added to the luminaire 150 that is be closest to the parking lot entrance to increase the lighting in that area.

If the target illumination, fc(target), for a specified point lies between the foot-candle level from n LED modules fc(n) at the nearest luminaire and the foot-candle level from n+1 LED modules fc(n+1) at the nearest luminaire, then the target foot-candle level may be reached by dimming the luminaire with n+1 LED modules by a dimming factor of fc(target) divided by fc(n+1). In this manner, dimming levels may be determined for all luminaires to meet the meet the target foot-candle levels, without providing excessive illumination or consuming excessive power.

Figure 16:
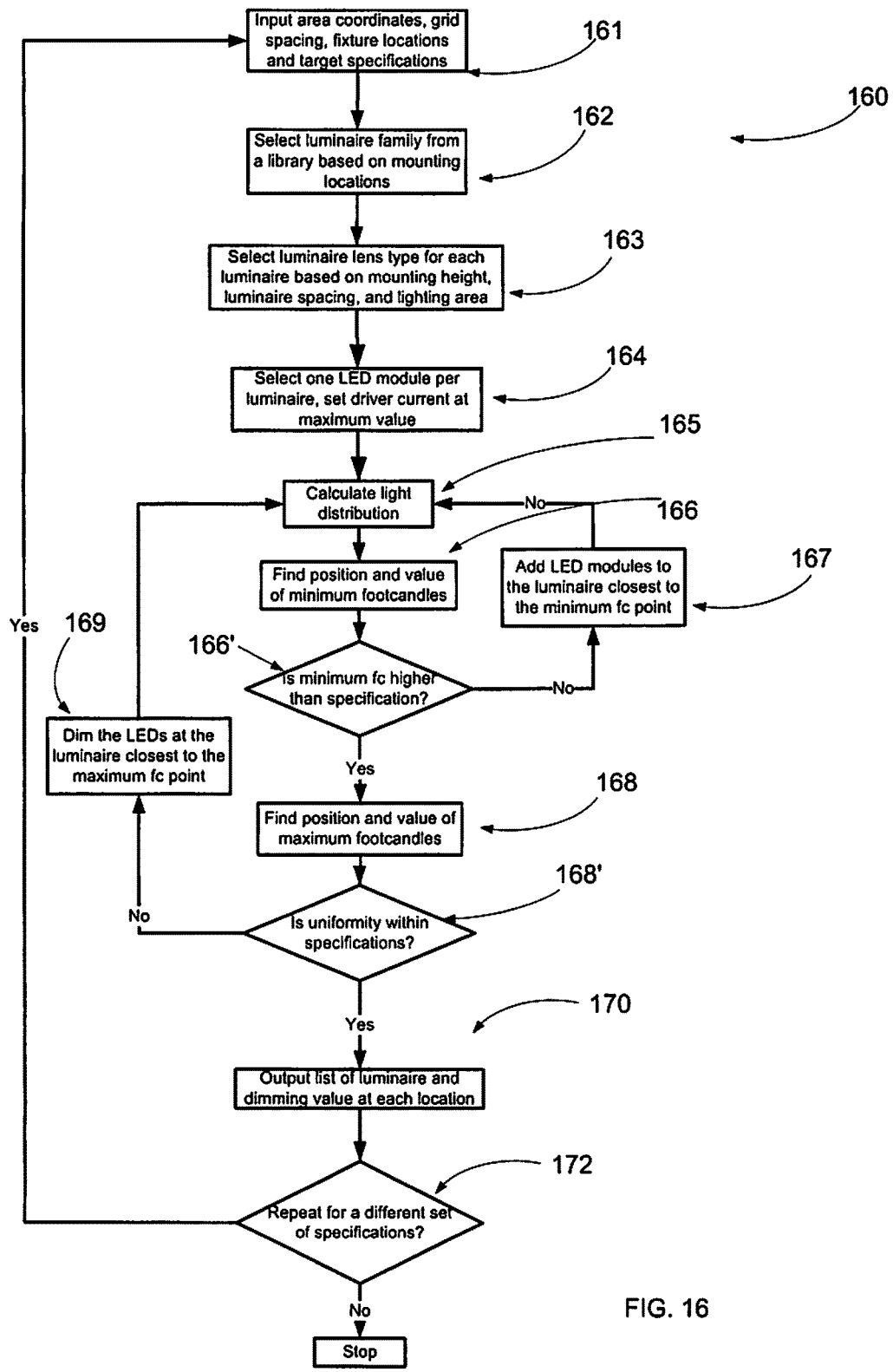
FIG. 16 is a process flow diagram for an algorithm that selects and adjusts LED modules in an LSN.

In another embodiment, an algorithm in the software may automatically select the number of LED modules per luminaire, the LED lens type, and the drive current per luminaire to meet or exceed the lighting requirements with the lowest cost. FIG. 16 illustrates a flowchart for an embodiment method 160 defined by the algorithm. In various embodiments, a processor of a computing device (or computer) may be configured to perform the operations of the method 160. At the initial step 161, a map of the area may be generated and the coordinate grid and reference are defined with fixtures placed at specified locations and the target specifications for minimum and maximum foot-candles are defined. At the next step 162, the type of lighting fixture at each mounting point may be selected from a library of luminaires. At step 163 the lens type from FIG. 8 for each luminaire may be selected based on the mounting height, spacing to adjacent luminaires, and geometry of the lighting area. Then the algorithm may find the light distribution at all grid points for the case where each luminaire has the minimum number of LED modules, with maximum drive current (steps 164 and 165). It then finds the minimum foot-candle value within the grid (step 166). If that value is determined to be below the minimum required foot-candles at step 166', then it adds an LED module to the nearest luminaire (step 167) and recalculates the distribution. Steps 165, 166, 167 are repeated until calculated foot-candles at all grid points are greater than the target minimum foot-candles. Then (step 168) the position in the grid and value of the calculated maximum foot-candle may be determined. If the computer determines the calculated value may be greater than the specified maximum foot-candle at step 168', then at step 169 the nearest luminaire may be dimmed by a factor of the target maximum value divided by the calculated maximum and the light distribution may be recalculated. This calculation may be repeated for the next resultant maximum foot-candle value until all calculated values are between the target maximum and minimum values. The output list of luminaire product codes and assigned dimming values are then saved and output at step 170. At step 172, the computer may determine whether the calculation may then be repeated for a different set of specifications or whether the procedure may be terminated.

As described above, a methodology may measure light levels with simple detectors to calibrate each light with scaling factors in order to enable determining the real-time light distribution of each light, given (a) measured real-time values with calibration factor for the meter to determine the scaling vs. the start-of life value, (b) the measured performance of each luminaire compared to a known calibrated luminaire, and (c) software calculation using the calibrated photometric file and scaling factors. Once these parameters are known, graphical and numerical design and control software may then calculate the actual real-time photometric distribution for any dimming level on any installed light. Assuming that the dimming levels for the designated area are software accessible through a wired or wireless network, software applications can reduce peak power for "hot" lights to save electricity, and exceed or match pre-upgrade light distributions with the opportunity to optimize the lumens per Watt at each light.

Figure 17:
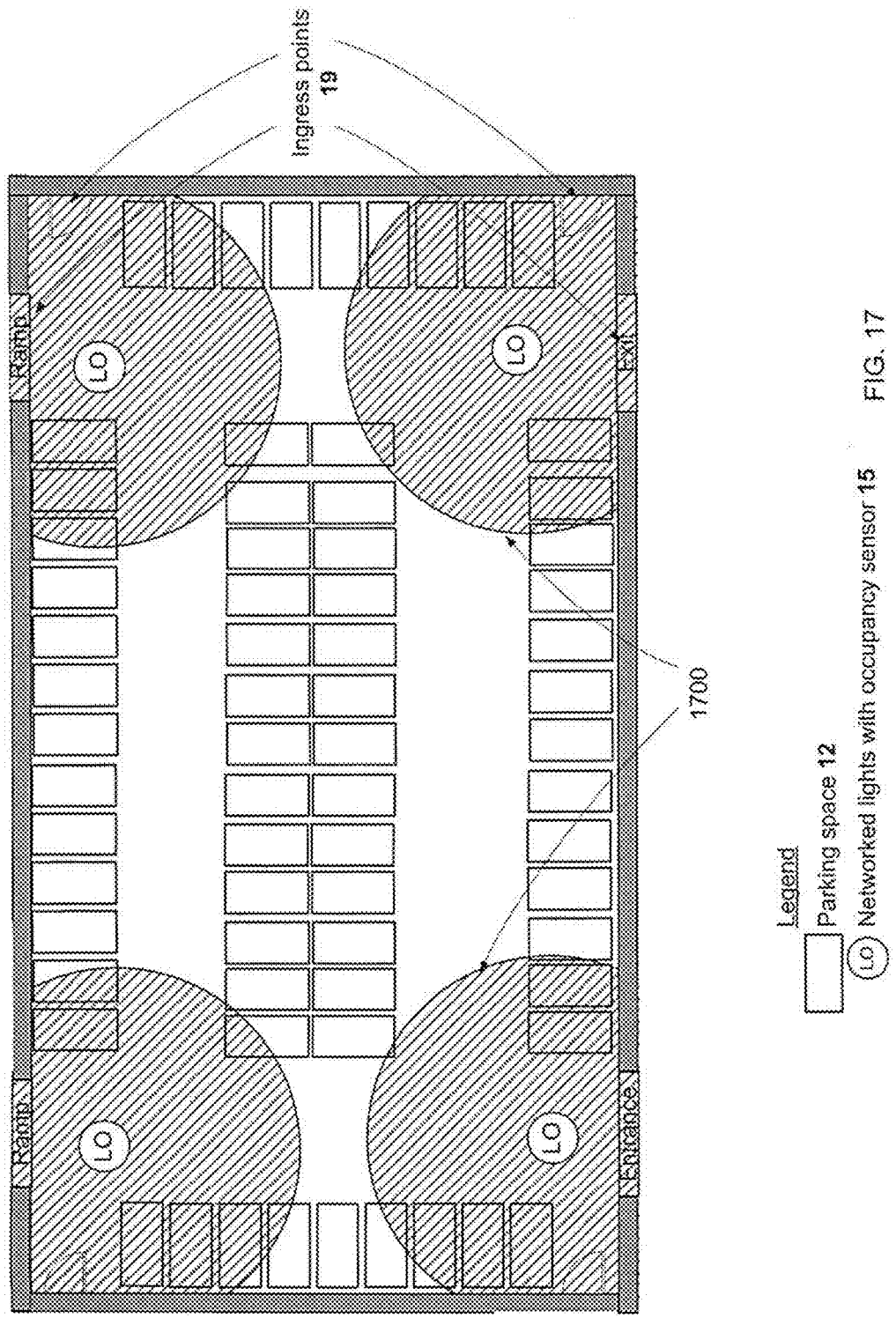
FIG. 17 is a schematic top view of the range of occupancy sensors superimposed on a facilities and luminaire location map of the exemplary parking lot in FIG. 1.

The same techniques to display iso-lines overlaid on a map may be used to display sensor ranges. Similar to the transformation done for luminaires, the calculated range for each occupancy sensor may be calculated relative to the sensor location and then translated to a global coordinate system. FIG. 17 shows a plan view of the calculated range of the occupancy sensors 1700 as projected onto the ground plane for an occupancy sensor integrated with LSN luminaires for the parking lot example of FIG. 1. Other symbols in FIG. 17 may have the same meaning as in FIG. 1. This sensor range may be plotted for any sensor with a known or estimated range as a function of its position. This may be performed for the field of view of cameras, infrared detectors, RFID detectors, etc. Sensor ranges are useful for planners to determine the sensor coverage, determine which sensors are redundant, and where extra sensors are required. With the overlay of the sensor coverage areas on a map, a person may detect the range of sensors relative to critical areas such as pathways, and entry/exit doors. In the example shown in FIG. 17, the designer may want to ensure that the occupancy sensors cover all ingress points 19 for the area.

Figure 18:
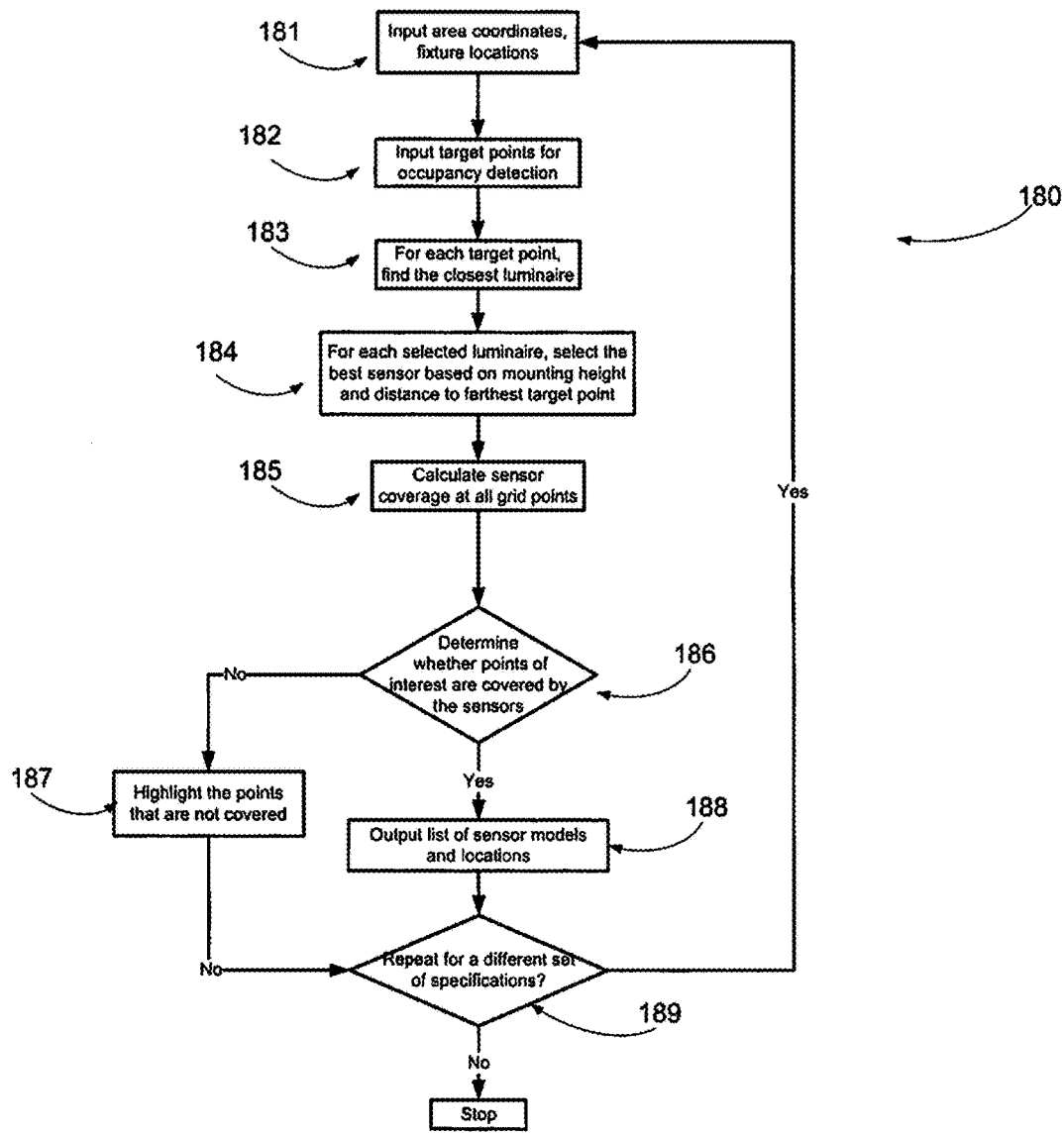
FIG. 18 is a process flow diagram for an algorithm that selects occupancy sensor lenses and locations.

In another embodiment, the designer may specify select points that should trigger an occupancy sensor and a software algorithm determines the ideal choice of occupancy sensor from a library of available components, and determines which lights should have the occupancy sensor. A flowchart for an embodiment method 180 for an algorithm that performs this calculation is shown in FIG. 18. In various embodiments, the method 180 may be performed by a processor of a computing device (or computer). At the initial step 181, a map of the area may be generated and the coordinate grid and reference are defined with fixtures placed at specified locations and at step 182 the target points at which the occupancy sensor should detect movement are defined. At the next step 183, the nearest fixture to each target point may be determined. At step 184 the sensor type for each fixture determined in step 183 may be selected from a library of available sensors, based on fixture mounting height and distance to the farthest target point. Then the algorithm finds the sensor coverage at all grid points (step 185) for the case where each luminaire from step 183 has the specified sensor from step 184. Then, the algorithm determines whether all the specified points are covered by sensors at step 186. At step 188, the computer may output the results which consists of a list of the product code of each sensor and its luminaire location. At step 187 the computer may highlight a list of points that were not covered by the sensors. At step 189, the computer may determine whether to repeat the calculation for a different set of specifications. In the case where placing sensors at the luminaire locations does not provide full coverage, then remote sensor modules may be considered. Those skilled in the art will recognize that calculation of the range of remote sensor modules may be done with the same algorithm as shown in FIG. 18.

Figure 19:
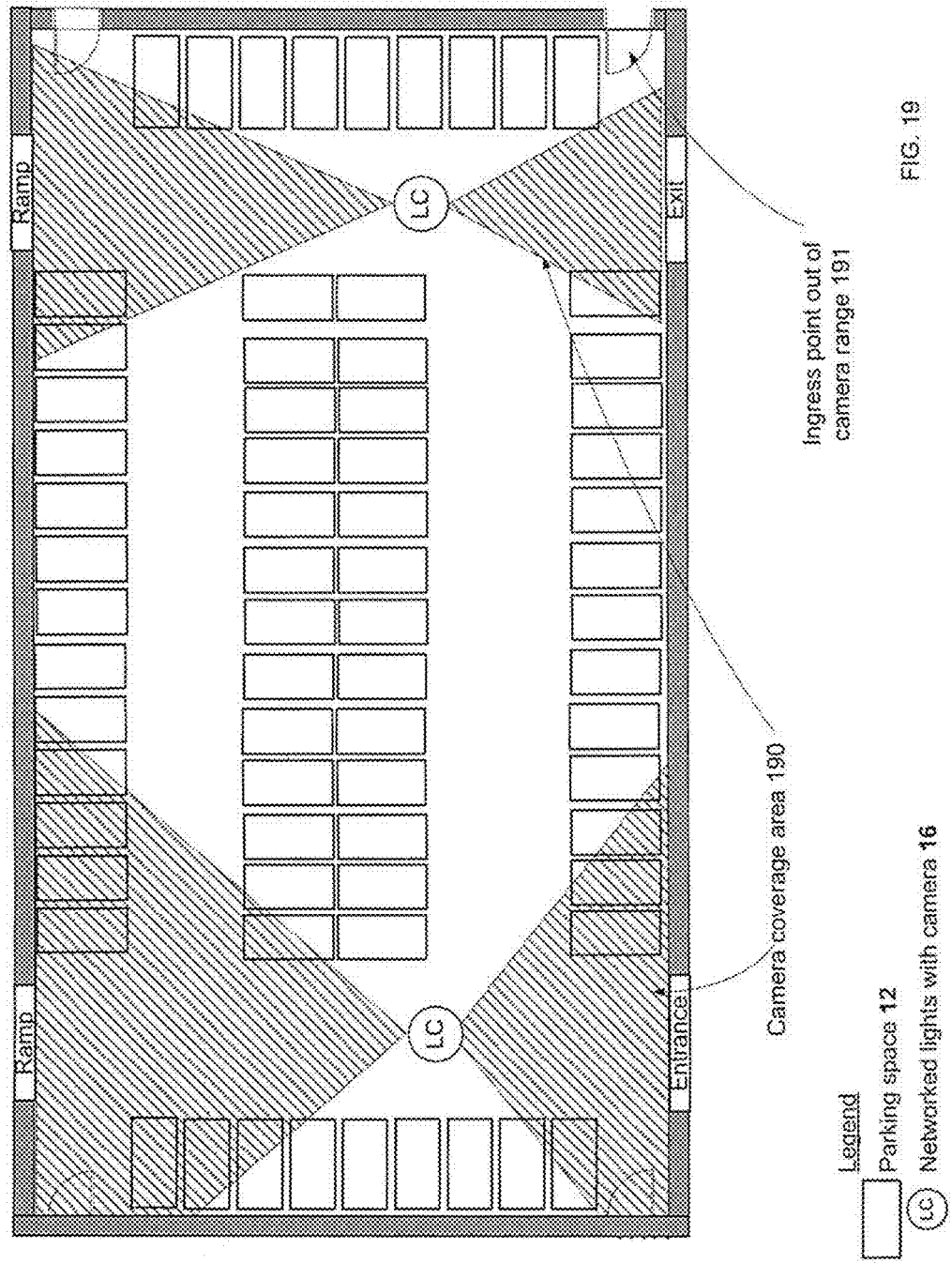
FIG. 19 is a schematic top view of the fields of view of security cameras superimposed on a facilities and luminaire location map of the exemplary parking lot in FIG. 1.

In a more generalized embodiment, the LSN design software may contain a library of sensor modules for different applications. Each sensor may have a dynamic range and field of view with a function for its sensitivity versus viewing angle in three-dimensional space. The LSN design software can use the same techniques as described above for lighting to calculate and display the dynamic range and signal strength of any sensor for any point at a defined position relative to the sensor. The LSN design software can therefore determine for each sensor in the library the optimum location relative to a specified sensing location, and determine the optimum orientation of the sensor. The LSN design software may determine sensor parameters, such as power levels, gain, and time constants. For example, the field of view for camera sensors integrated with LSN nodes may be calculated and displayed on the facilities map. For the parking lot example of FIG. 1, FIG. 19 shows an example where the plan view of the coverage area 190 of cameras integrated into LSN luminaires may be displayed. Given the mounting height and orientation and the field of view of the camera lens, the coverage area 190 of each camera may be determined and displayed as shown in FIG. 19. Other symbols in FIG. 19 may have the same meaning as in FIG. 1. From this display, a system designer may determine if the security cameras are covering all points of interest. For example, FIG. 19 shows an example of an ingress point 191 that may be not covered by the planned cameras. With this knowledge, the system designer may change the camera angle or the camera field of view, or deploy more cameras as required.

Figure 20A:
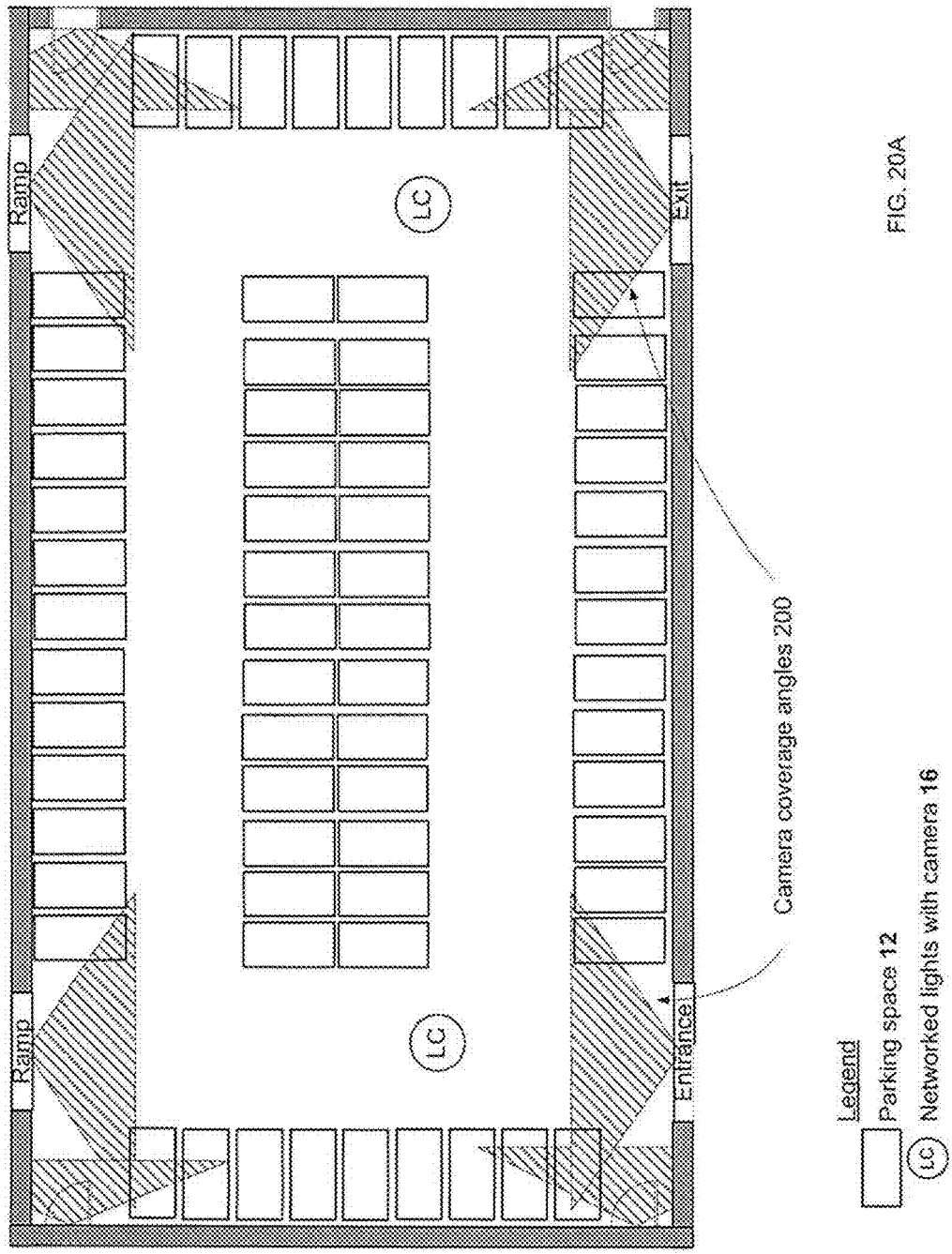
FIG. 20A is a schematic top view showing user interface icons to select the observation points and range of viewing angles for placing security cameras.
Figure 20B:
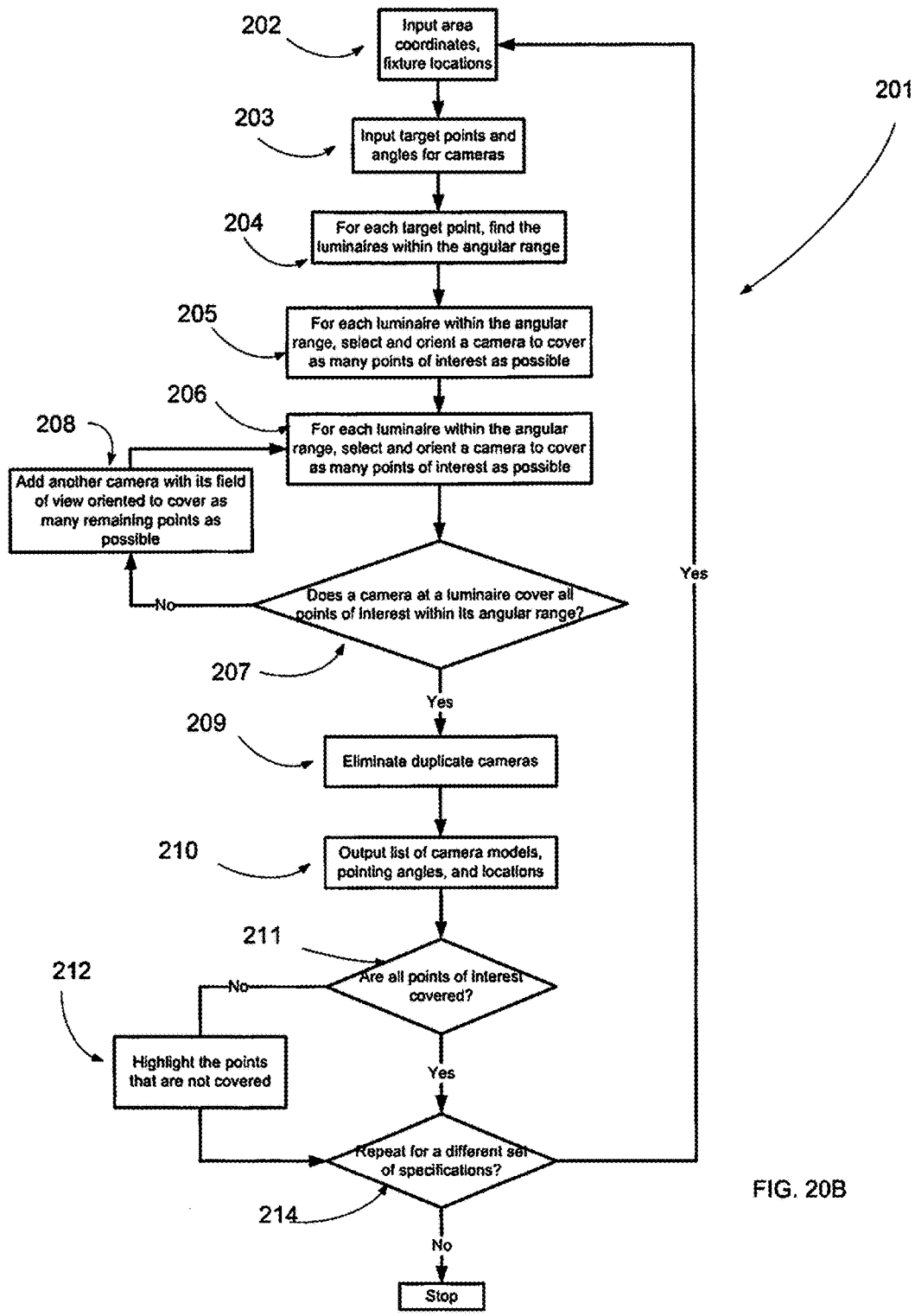
FIG. 20B is a process flow diagram for an algorithm that selects camera locations and angles.

In another embodiment, the system designer may specify points of coverage for the cameras and an algorithm selects which cameras to deploy, where to mount the cameras, and how to point the cameras. For cameras, points are defined with an adjustable icon that defines the range of acceptable camera angles 200 as shown in FIG. 20A. Other symbols in FIG. 20A may have the same meaning as in FIG. 1. An embodiment method 201 for performing the algorithm, as described by the flowchart in FIG. 20B, determines from a library of cameras the camera selections, locations, and pointing angles to cover all points of interest. In various embodiments, the method 201 may be performed by a processor of a computing device (or computer). At the initial step 202, a map of the area may be generated and the coordinate grid and reference are defined with fixtures placed at specified locations and at step 203 the target points and angles at which the camera should view the target points may be defined. At the next step 204, the nearest fixture to each target point within the defined angular range may be determined. At step 205 the camera type for each fixture determined in step 204 may be selected from a library of available cameras, based on the field of view of each camera and distance from each mounting point to the farthest target point. Then the algorithm finds the camera coverage at all viewing points (step 206). The algorithm determines if all the specified points are covered by cameras (step 207) and either adds more cameras (step 208) and recalculates or proceeds to step 209 where camera overlaps are calculated to eliminate duplicate cameras. After the cameras are selected the results are saved and output at Step 210. Step 211 determines whether any of the target points are not covered by installing cameras at the luminaire locations. In that case, remote camera modules may be considered. At step 212, the computer may highlight the points that are not covered. At step 214, the computer may determine whether to repeat the calculation for a different set of specifications.

The above descriptions describe techniques for computing lighting parameters at various locations. The calculations used in plotting iso-foot-candles and iso-candelas for lights are the same for the radio frequencies of WiFi or other radio wave based networks. Thus the capability in the software to do the calculation and display for the lights, enables reuse of the same methods for a WiFi or other radio-based network. RF transmitter strengths and receiver sensitivities along with the propagation loss and other penalties may be used to calculate the working range between a wireless end point and an access point. Without detection or interference, the RF signal has a circular distribution relative to the AP for isotropic antennas. The range of each access point obtained by the calculations may be then displayed in a contour plot that may be plotted vs. relative coordinates or GPS coordinates to illustrate to a user the end points that are within range of each access point. As a reasonable approximation, the receiver margin in deciBels (dB) for an RF link may be given by the following equations:

$$\text{Rx Margin(dB)} = \text{Received Power(dBm)} - \text{Receiver Sensitivity(dBm)} - \text{Penalties(dB)} \quad \text{Eq. 9}$$

where Penalties (dB) accounts for fading caused by multipaths and crosstalk and $$\text{Received Power(dBm)} = \text{Transmitted Power(dBm)} + \text{Gains(dB)} - \text{Path Loss(dB)} \quad \text{Eq. 10}$$

where Gains (dB) accounts for the transmitter and receiver antenna gains, and the free-space path loss may be given by:

$$\text{Path Loss(dB)} = 20 \log 10(d) + 20 \log 10(f) + 32.45 \quad \text{Eq. 11}$$

where d may be in kilometers and the frequency f of the radio signal may be in MHz.

The range of an RF link may therefore be calculated using Eq. 9-11, for a specified receiver margin, transmitted power, antenna gains, frequency of the radio signal. Those skilled in the art recognize that the gain of an RF signal depends on the antenna design and angle between the transmitter and receiver. With known antenna patterns, and calculated angles between the transmitter and receiver, the angular dependence of gain may be taken into account when calculating the RF range.

Figure 21:
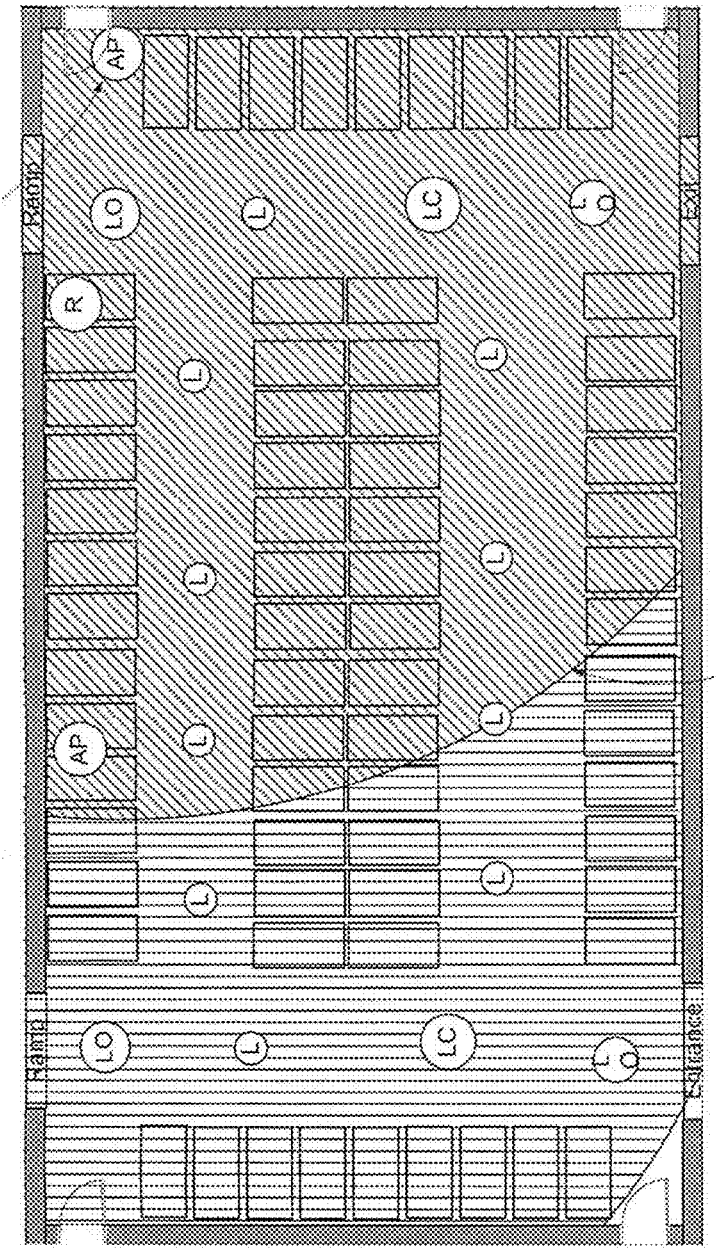
FIG. 21 is a schematic top view showing the range of wireless access points superimposed on a facilities and luminaire location map of the exemplary parking lot in FIG. 1.

FIG. 21 shows an example where an access point (AP) located at the corner of the parking lot 2101 has a calculated range 2100 shown by the diagonal shading within a circle for the case where the AP has an isotropic dipole antenna. This example shows an isotropic antenna distribution, those skilled in the art will recognize that the range of an anisotropic antenna may also be calculated based on a directional measurement of the antenna strength. FIG. 21 may show the network operator that the two end points outside of the circle may not have a strong enough signal to reliably connect to the AP. The operator may fix this by increasing the antenna gain or by adding more access points. If the RF network calculation determines that an AP 17 may be beyond the range of the nearest gateway node 20, then one or more repeaters are deployed between the AP 17 and the gateway node 20 to bridge the signals between the AP and the server 22. Furthermore, the system design may determine the association between each network node and may be primary access point, and also determine if a secondary access point may be in range in the event that the primary access point fails.

In another embodiment, once the locations of the network nodes are defined, an algorithm selects the optimum locations for the access points based on possible mounting points, and the reach to network. The algorithm, which is similar to the sensor algorithm in FIG. 18, may determine from a library of network nodes and antennas the lowest cost solution that covers all network nodes with sufficient margin. The points of coverage may be selected by pointing and clicking on the facilities map, or by entering a table of coordinate values. The LSN design software can also estimate the bandwidth required by each LSN element and determine the aggregate bandwidth at each access point, repeater, and gateway node to estimate the monthly network access charges, and if there are any network bottlenecks.

The preceding text describes methods and a software interface that may plan and optimize all aspects of an LSN deployment. The calculations for lights, sensors, and RF signal strengths described above all resulted in an output plotting of signal strength versus location in a 2-dimensional contour plot. For a system that combines two or more of the three elements, the same user interface may be used to plot each element selectively or simultaneously. This provides a full visual representation of any or all elements relative to the same positional coordinates.

Figure 22:
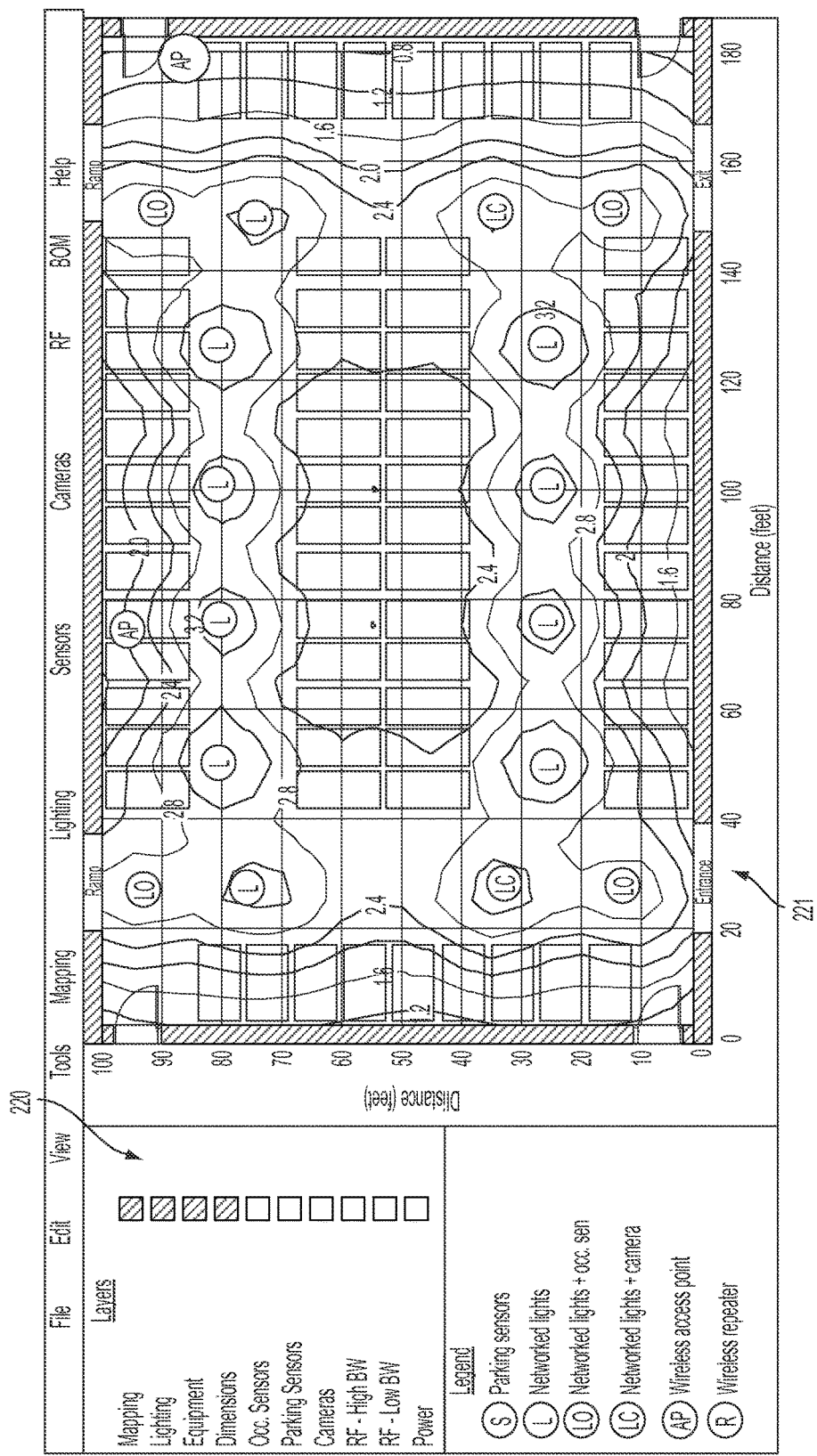
FIG. 22 is an exemplary diagram of a graphical user interface of computer-aided design software used to design an LSN.

The methods have a common user interface with the same facilities map, with selectable overlays for light levels, sensor ranges, and RF signal levels. FIG. 22 shows an exemplary graphical user interface (GUI) of the design software. The GUI may have a layer selection tool 220 to enable the user to select which layers are displayed in the GUI. For the example shown, the "Mapping", "Lighting", "Equipment", and "Dimensions" layers are activated and shown in the graphical window 221. The user may also select other layers to be displayed to visualize the sensor ranges, camera ranges, and RF signal ranges as shown in previous figures. The facilities map 140 can be drawn within the design tool, or imported from other software in standard file formats. Those skilled in the art will recognize that the software may have standard elements of other computer-aided design (CAD) software such as drag and drop capability to place and move LSN equipment; file import and export; calculation controls; controls for the visibility of layers; menus to select options and define parameters such as the pass/fail criteria for the calculations; menus to select between local and GPS coordinates, menus to select the input, calculation, and output units; double clicking to view and edit device properties; and different, editable graph outputs with export capability.

Figure 23:
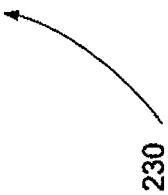
FIG. 23 is an exemplary table of the bill of materials output from the LSN design software.

One exemplary output of the LSN design software is the output bill of materials (BOM) shown in FIG. 23. After the designer has placed the LSN components and run the calculations to verify that the selected elements meet the system requirements, a BOM can be generated in a specified format. The BOM may be sent to the LSN supplier to request a price quote and order the LSN equipment. The BOM may also contain information used in deploying the LSN, such as the location of each piece of equipment; the power consumption per LSN element, power consumption per electrical circuit, and the total power consumption; and the orientation of cameras and antennas, and network connections.

The LSN design software may run as a standalone application on a user's computer, or it may run on the same server 22 that is used to monitor the LSN. In either case, after the LSN is installed, the LSN design software may be used to visualize the actual conditions of the LSN by exchanging data with the LSN control software running on the server 22. For example, if the LSN control software adjusts the dimming levels of the luminaires, the dimming level of each luminaire can be sent to the LSN design software and used to modify the display of the iso-foot-candles.

The embodiments may utilize calculations and optimization algorithms for selecting the luminaire models and dimming levels to meet target light levels, selecting the sensor placement and orientation so that the sensors cover the required areas, determining which sensors are integrated with lights and which sensors are standalone with a wireless connection to a neighboring light, selecting the type and number of access points and repeaters and their locations so that all networked lights and sensors have a reliable network connection, assigning the primary and secondary connections each networked device, providing a layered visualization of light levels, sensor ranges, and network ranges overlain on a site map to enable users to visualize all aspects of the system design, estimating light levels incident on any devices powered with photovoltaic cell and estimate photovoltaic energy conversion based on the light levels and selected photovoltaic specifications, for different operating conditions, estimating the power consumption of all components, estimate the power consumption per electrical circuit, and estimate the power consumption of the complete system, creating a bill of materials (BOM) to order the required equipment, creating installation guidelines to provision equipment, aim sensors as required, and make the network connections, minimizing cost by selecting the lowest cost selection of equipment to meet the system requirements, and after installation, providing real-time data and visualization of the light levels, sensor readings, network signal strengths, and power consumption.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" may be not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality may be implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a non-transitory processor-readable, computer-readable, or server-readable medium or a non-transitory processor-readable storage medium. The steps of a method or algorithm disclosed herein may be embodied in a processor-executable software module or processor-executable software instructions which may reside on a non-transitory computer-readable storage medium, a non-transitory server-readable storage medium, and/or a non-transitory processor-readable storage medium. In various embodiments, such instructions may be stored as processor-executable instructions or stored processor-executable software instructions. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory processor-readable storage medium and/or computer-readable medium, which may be incorporated into a computer program product.

The preceding has been a detailed description of a system for calculating lighting placement, sensor sensitivity, and wireless signal strength. The preceding description of the disclosed embodiments may be provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention may be not intended to be limited to the embodiments shown herein but may be to be accorded the widest scope consistent with the following claims and the principles and novel features disclosed herein.

I claim:

1. A method for designing a light sensory network (LSN) in a specified area, the method comprising:
    selecting luminaires, sensors, and network devices with known characteristics from a product library;
    calculating an illumination over the specified area for the selected luminaires, wherein the selected luminaires are installed at specific mounting locations within the specified area;
    adjusting dimming levels of the selected luminaires to meet specified requirements for a maximum illumination and a minimum illumination based on the calculated illumination;
    calculating a range of the selected sensors over the specified area;
    adjusting one or more of the selected sensors such that the adjusted sensors are capable of detecting specified events or parameters at a specified set of points within the specified area, wherein adjusting the one or more of the selected sensors includes adjusting orientations of the selected sensors;
    calculating a range of wireless network devices integrated with the selected luminaires and the selected sensors;
    adjusting one or more network elements, antenna gains, and locations of the selected network devices such that the network devices have sufficient margin to communicate with control software on a remote computer;
    displaying, on a display, an image of the specified area with wireless network locations, ranges, and signal strengths for the selected luminaires, the selected sensors, and the selected network devices, wherein the step of displaying comprises displaying a contour plot as a function of desired coordinates to illustrate to a user the calculated illumination, the calculated range of the selected sensors, and the calculated range of the wireless network devices; and
    tabulating one or more of the power consumption, equipment settings, and locations of at least one of the selected luminaires, sensors, and network devices.

2. The method of claim 1, wherein for each luminaire in the product library, the step of calculating the illumination over the specified area comprises:
    measuring a Candela distribution versus viewing angles of a typical luminaire at a peak drive current;
    storing results from the measurement of the Candela distribution versus the viewing angles of the typical luminaire at the peak drive current in a first format that tabulates Candela versus horizontal and vertical viewing angles;
    measuring a proportional change in Candelas at a specified viewing angle versus the peak drive current of the typical luminaire;
    storing results from the measurement of the proportional change in a second format that tabulates a percent change in Candela versus the peak drive current;
    specifying an array of calculation points in the specified area;
    adding, for each calculation point in the array of calculations points in the specified area, a foot-candle contribution, wherein the adding comprises:
        calculating a distance and angles from the each calculation point to each luminaire in the product library;
        interpolating a table of Candela versus horizontal and vertical angles to obtain a Candela value at a peak drive current at the calculation point;
        interpolating a table of percent change in Candela versus the peak drive current to obtain a Candela value of each luminaire; and
        using the calculated angles and the calculated distance to calculate the foot-candle contribution from each luminaire.

3. The method of claim 1, further comprising obtaining target specifications for illumination in the specified area by measuring an existing illumination over the specified area with a mobile measuring device that moves along a path through the specified area while measuring illumination as a function of position in the specified area.

4. The method of claim 1, wherein tabulating the power consumption comprises:
    measuring a typical power consumption of each device in the product library at maximum settings;
    measuring how the typical power consumption changes for adjustable devices in the product library, wherein the adjustable devices have adjustable output levels;
    calculating output levels for each of the adjustable devices;
    using the calculated output levels of each of the adjustable devices to calculate the power consumption of each of the adjustable devices; and
    adding up the calculated power consumption of all the adjustable devices.

5. The method of claim 4, further comprising comparing the tabulated power consumption to a known power consumption of legacy equipment to estimate a change in power between the LSN and the legacy equipment.

6. The method of claim 1, wherein selecting the sensors comprises:
specifying parameters to be monitored; and
selecting sensor devices that monitor the specified parameters, the method further comprising:
specifying observation points for one or more of the specified parameters;
specifying observation angles for one or more of the specified observation points;
determining sensor locations that are within a range of the specified observation points; and
determining sensor orientations for the selected sensor devices that observe the specified observation points at the specified observation angles.

7. The method of claim 1, wherein the known characteristics of the selected luminaires, the selected sensors, and the selected network devices are tabulated as intensity levels versus horizontal and vertical angles such that a signal strength at any direction and a distance can be calculated from each of the selected luminaires, the selected sensors, and the selected network devices.

8. The method of claim 1, wherein the calculated illumination, location, and orientation of the selected sensors is used to calculate a possible power generated by photovoltaic cells mounted on the selected sensors.

9. The method of claim 1, further comprising operations for adjusting devices within the lighting sensor network (LSN), the LSN including an array of sensors or emitters, an array of solid-state lamps, and devices that sense or emit electromagnetic waves, the operations for adjusting devices comprising:
determining a sensing or emitting distribution for one or more of the devices that sense or emit electromagnetic waves;
integrating the sensing or emitting distribution over an area to be covered by the array of sensors or emitters; and
adjusting the sensors or emitters in the array of sensors or emitters to provide a desired coverage based on the integrated distribution, wherein adjusting comprises at least one of repositioning, reconfiguring, and reorienting the sensors or emitters in the array.

10. The method of claim 9, wherein the LSN includes wireless access points that are configured to communicate to wireless end points associated with the array of solid-state lamps and/or the array of sensors or emitters, are designed to provide adequate signal strength, and are positioned to provide adequate signal strength.

11. A system for designing a light sensory network (LSN) in a specified area, the system comprising at least a database, a user interface, and processor-executable instructions configured to cause a processor to perform operations comprising:
selecting luminaires, sensors, and network devices with known characteristics from a product library; calculating an illumination over the specified area for the selected luminaires, wherein the selected luminaires are installed at specific mounting locations within the specified area;
calculating an illuminance over the specified area by interpolating tables of luminous intensity versus horizontal, vertical angles, and dimming levels for each of the selected luminaires for adding up a cumulative illuminance at each specified point in the specified area;
automatically increasing a number of lighting modules at one or more luminaire locations when the cumulative illuminance at any point in the specified area falls below a specified minimum illuminance;
automatically adjusting dimming percentages to luminaires when the cumulative illuminance at any point in the specified area falls above a specified maximum illuminance; and outputting in a useable format the location, type, and dimming level of each of the selected luminaires;
adjusting dimming levels adjusting of the selected luminaires to meet specified requirements for a maximum illumination and a minimum illumination based on the calculated illumination; calculating a range of the selected sensors over the specified area;
adjusting one or more of the selected sensors such that the sensors are capable of detecting specified events or parameters at a specified set of points within the specified area, wherein adjusting the one or more of the selected sensors includes adjusting orientations;
calculating a range of wireless network devices integrated with the selected luminaires and the selected sensors;
adjusting one or more network elements, antenna gains, and locations of the selected network devices such that the network devices have sufficient margin to communicate with control software on a remote computer;
displaying, on a display, an image of the specified area with wireless network locations, ranges, and signal strengths for the selected luminaires, the selected sensors, and the selected network devices; and
tabulating one or more of the power consumption, equipment settings, and locations of at least one of the selected luminaires, sensors, and network devices.

12. The system of claim 11, wherein the processor-executable instructions are configured to cause the processor to perform operations further comprising:
automatically calculating the power consumption using input data comprising a typical power consumption of each device in the product library at maximum settings, input functions defining how the typical power consumption changes for adjustable devices in the product library with adjustable output levels, calculating the output levels of each of the adjustable devices, and using the calculated output levels of each of the adjustable devices to calculate the power consumption of each of the adjustable devices;
adding up the power consumption of all the adjustable devices;
listing a total power consumption of each integrated LSN element; and
listing the power consumption of a specified group of devices.

13. The system of claim 11, wherein the processor-executable instructions include design software and are configured to cause the processor to perform operations further comprising:
exchanging real-time data with software that controls and monitors the light sensory network, wherein the real-time data specifies lighting levels, sensor readings, and wireless signal strengths; and
displaying, on the display, the image of the specified area with locations, ranges, and the signal strengths of the selected luminaires, the selected sensors, and the selected network devices using the real-time data.

14. The system of claim 11, wherein one or more of the selected sensors are one of still cameras or video cameras that can be selected, located, and rotated to point at specified observation points within specified angular ranges.

15. The system of claim 11, wherein the processor-executable instructions are configured to cause the processor to perform operations further comprising:
   estimating an operating margin of all network devices to a single server; and
   adding one or more network devices in response to determining the estimated operating margin for any of the one or more network devices is not adequate.

16. The system of claim 11, wherein the processor-executable instructions are configured to cause the processor to perform operations further comprising:
   receiving inputs from a user, the inputs including specified parameters to be measured at specified observation points, optional specified viewing angles of one or more of the specified parameters at the specified observation points, and optional specified sensor locations; and
   calculating an optimum placement and an optimum orientation of the sensors with parameters listed in the database by calculating a range and a viewing angle of each of the sensors for each of the specified parameters, the specified observation points, and the specified viewing angles.

17. The system of claim 16, wherein one of the specified parameters is incident light that powers the sensors.

18. The system of claim 16, wherein one or more of the sensors are cameras that include one or more of still cameras and video cameras, and
   wherein the user interface comprises an interactive function to select, locate, and rotate the cameras to point at the specified observation points within specified angular ranges.

* * * * *